(12) United States Patent
Horikawa

(10) Patent No.: US 8,891,030 B2
(45) Date of Patent: Nov. 18, 2014

(54) DISPLAY METHOD, DISPLAY APPARATUS, OPTICAL UNIT, METHOD OF MANUFACTURING DISPLAY APPARATUS, AND ELECTRONIC EQUIPMENT

(75) Inventor: Yoshiaki Horikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 14 days.

(21) Appl. No.: 13/440,354

(22) Filed: Apr. 5, 2012

(65) Prior Publication Data

US 2012/0200810 A1   Aug. 9, 2012

Related U.S. Application Data

(60) Provisional application No. PCT/JP2010/066380, filed on Sep. 22, 2010.

(30) Foreign Application Priority Data

Oct. 7, 2009  (JP) ................................. 2009-233236
Dec. 28, 2009  (JP) ................................. 2009-298584

(51) Int. Cl.
  *G02F 1/1335*  (2006.01)
  *G02F 1/1333*  (2006.01)
  *G09F 9/33*  (2006.01)
  *G09F 9/302*  (2006.01)

(52) U.S. Cl.
  CPC .............. *G09F 9/33* (2013.01); *G02F 1/33526* (2013.01); *G09F 9/3026* (2013.01)
  USPC ...... 349/11; 349/5; 349/13; 349/95; 349/110; 359/619

(58) Field of Classification Search
  CPC ............. G02B 27/017; G02B 27/0172; G02B 27/0176; G02F 1/133512

USPC ..................... 349/95, 110, 5, 11, 13; 359/619
See application file for complete search history.

(56) References Cited

U.S. PATENT DOCUMENTS 5,499,138 A * 3/1996 Iba ................................ 359/569
6,563,626 B1   5/2003 Iwasaki
(Continued)

FOREIGN PATENT DOCUMENTS

JP  09-097333   4/1997
JP  2000-249971   9/2000
(Continued)

OTHER PUBLICATIONS

International Preliminary Report on Patentability and Written Opinion, issued in corresponding International Patent Application No. PCT/JP2010/066380.

(Continued)

*Primary Examiner* — Nathanael R Briggs
(74) *Attorney, Agent, or Firm* — Kenyon & Kenyon LLP

(57) ABSTRACT

A display method of forming an image by using a plurality of pixels includes projecting light beams from the plurality of pixels on a pupil of an eye of an observer, and each diameter of the light beams which are incident on the pupil is smaller than a diameter of the pupil.

Moreover, a display apparatus which displays an image having a plurality of pixels includes a micro lens array having a lens corresponding to each pixel, and a plurality of light exit points is formed corresponding to each pixel.

Furthermore, an electronic equipment has the display apparatus installed thereon.

51 Claims, 23 Drawing Sheets

(56) References Cited

U.S. PATENT DOCUMENTS

| | | | |
|---|---|---|---|
| 6,816,313 B2* | 11/2004 | Hara | 359/626 |
| 2002/0051118 A1* | 5/2002 | Takagi et al. | 351/211 |
| 2002/0186347 A1 | 12/2002 | Okamoto et al. | |
| 2005/0068475 A1* | 3/2005 | Kume et al. | 349/95 |
| 2008/0049152 A1* | 2/2008 | Hong et al. | 349/11 |
| 2008/0084156 A1* | 4/2008 | Choi et al. | 313/496 |
| 2009/0079664 A1* | 3/2009 | Nagai et al. | |
| 2009/0190076 A1* | 7/2009 | Yoshida et al. | 349/114 |
| 2009/0225150 A1* | 9/2009 | Ebisawa et al. | 347/233 |

FOREIGN PATENT DOCUMENTS

| | | |
|---|---|---|
| JP | 2002-131693 | 5/2002 |
| JP | 2002-303819 | 10/2002 |
| JP | 2002-365586 | 12/2002 |
| JP | 2003-315725 | 11/2003 |
| JP | 2004-157173 | 6/2004 |
| JP | 2007-094073 | 4/2007 |
| JP | 2007-128355 | 5/2007 |
| JP | 2007-133271 | 5/2007 |
| JP | 2007-187806 | 7/2007 |
| JP | 2009-063624 | 3/2009 |
| JP | 2009-151065 | 7/2009 |

OTHER PUBLICATIONS

International Search Report, issued in corresponding International Patent Application No. PCT/JP2010/066380.
Chinese Office Action dated Jun. 17, 2014, issued in corresponding Chinese Patent Application No. 201080044739.2.

* cited by examiner 48    49  47

48   49  47

DISPLAY METHOD, DISPLAY APPARATUS, OPTICAL UNIT, METHOD OF MANUFACTURING DISPLAY APPARATUS, AND ELECTRONIC EQUIPMENT

CROSS-REFERENCE TO RELATED APPLICATION

The present application is a continuation of PCT International Patent Application No. PCT/JP2010/066380 filed on Sep. 22, 2010, which is based upon and claims the benefit of priority from the prior Japanese Patent Application Nos. 2009-233236 filed on Oct. 7, 2009 and 2009-298584 filed on Dec. 28, 2009, each of which is expressly incorporated herein in its entirety by reference thereto.

BACKGROUND OF THE INVENTION

1. Field of the Invention

The present invention relates to a display method, a display apparatus, an optical unit, a method of manufacturing display unit, and an electronic equipment in which the display unit is mounted.

2. Description of the Related Art

As a display apparatus (display) which displays images and characters, display apparatuses such as a liquid crystal display and a plasma display are available. However, in these display apparatuses, diopter adjustment is not available. Incidentally, with the aging of society, there is an increase in the number of elderly people having farsightedness (presbyopia) due to old age. It is desirable that even such elderly people with farsightedness are able to see the display apparatus easily. For this, a display apparatus, particularly a flat-panel display (hereinafter, called appropriately as 'FDP') which has diopter adjustment, has been sought.

Particularly, with widespread use of mobile telephones and digital cameras, there is an increase in the number of occasions of looking at a display by the FDP outdoor. It is extremely cumbersome to put on or take off reading glasses every time for looking at the FPD of a mobile telephone or a digital camera.

Moreover, in a digital single-lens reflex camera, the FPD is used as a live-view monitor. In the digital single-lens reflex camera, it is not practical to put on or take off reading glasses every time for looking the live-view monitor while looking at a distant object.

Moreover, while looking at a monitor of a car navigation system, an observer is in the course of driving. Therefore, it is dangerous to put on or take off reading glasses, and it is virtually impossible. Apart from this, even at the time of observing a liquid-crystal screen of a personal computer (PC), it is cumbersome for the observer to put on or take off reading glasses. Therefore, an electronic equipment with a monitor which is visible without putting on or taking off reading glasses has been sought.

Namely, an FDP has not existed in which a focused image could be observed regardless of putting reading glasses on. Moreover, such electronic equipment has not existed. It has been necessary to put on or take off spectacles such as reading glasses. Such problems have been pointed out recently. For example, in Japanese Patent No. 3552413, a method of displaying a corrected picture image to which an edge enhancement is performed has been proposed. Moreover, in Japanese Patent Application Laid-open Publication No. 2007-128355, a method using pre-corrected picture image generated by an inverse matrix of Toeplitz matrix has been proposed. Furthermore, in Japanese Patent Application Laid-open Publication No. 2009-63624, a method of using a magnifying lens (loupe) has been proposed.

SUMMARY OF THE INVENTION

In the method of edge enhancement according to the Japanese Patent No. 3552413, although display information is made somewhat visible, it is not possible to restore a defocus image. The cause of blurring of an image is defocus. However, since the correction in Japanese Patent 3552413 is not by using information of defocus, it is obvious that the defocus image cannot be restored.

Moreover, in Japanese Patent Application Laid-open Publication No. 2007-128355, an image is corrected by using Toeplitz matrix constituted by a point-spread function due to insufficient focusing adjustment of an eye. Although no complex numbers appear in corrected image data, as a result, correction of a degree of edge enhancement is the same as in Japanese Patent No. 3552413. The practical effect being small, it has not reached up to the level of practical use.

Furthermore, in Japanese Patent Application Laid-open Publication No. 2009-63624, an example of an arrangement in which a Fresnel lens is attached at front of the FDP which is a monitor of a digital camera, and the FPD is looked inside as a magnifying lens is shown. However, since it is necessary to set apart the Fresnel lens up to the distance of few cm for correcting the farsightedness due to old age, it is not practical.

The present invention has been made in view of the above mentioned circumstances, and an object of the present invention is to provide a display method in which focusing is easy, a display apparatus or an optical unit using such display method, a method of manufacturing the display apparatus and an electronic equipment installing such display apparatus.

To solve the abovementioned issues and to achieve the object, according to a first aspect of the present invention, there can be provided a display method of forming an image by using a plurality of pixels, including projecting light beams from the plurality of pixels on a pupil of an eye of an observer, and Each diameter of the light beams which are incident on the pupil is smaller than a diameter of the pupil.

Moreover, according to a preferable aspect of the present invention, it is desirable that light emerged from one pixel is projected as a plurality of light beams which are separated mutually, and at least one of the light beams is incident on the pupil of the eye of the observer.

Moreover, according to a preferable aspect of the present invention, it is desirable that the plurality of light beams which are separated mutually is formed by providing a plurality of light exit points in one pixel.

According to a preferable aspect of the present invention, it is desirable that the light emerged from the pixel is formed as light beams by a lens corresponding to each pixel.

Moreover, according to a preferable aspect of the present invention, it is desirable that the light exit points are disposed such that not less than one light beam and not more than four light beams among the plurality of light beams is/are incident on the pupil of the observer.

According to a preferable aspect of the present invention, it is desirable that the diameter of the light beam which is incident on the pupil of the observer is in a range from 0.5 mm to 2 mm.

Moreover, according to a preferable aspect of the present invention, it is desirable that the light exit point is projected by the lens at a distance of more than 200 mm from a position of the lens.

According to a preferable aspect of the present invention, it is desirable that an angle between the light beams, which are mutually nearest among the plurality of the light beams which are separated mutually, is not more than 0.58 degrees.

Moreover, according to a preferable aspect of the present invention, it is desirable that the plurality of exit points is formed by using a mask having a plurality of apertures.

According to a second aspect of the present invention, there can be provided a display apparatus which displays an image having a plurality of pixels, including a plurality of light exit points formed corresponding to each pixel; and a micro lens array having lenses corresponding to each pixel.

According to another aspect of the present invention, there can be provided a display apparatus which displays an image having a plurality of pixels, including a plurality of light exit points formed in each pixel; and a micro lens array having lenses which form light emerged from light exit points as a plurality of light beams.

Moreover, according to a preferable aspect of the present invention, it is desirable that rows of the plurality of pixels are rows of the plurality of pixels of the image which is to be displayed.

According to a preferable aspect of the present invention, it is desirable that light emerged from the plurality of light exit points are formed as light beam by a lens corresponding to the pixel.

Moreover, according to a preferable aspect of the present invention, it is desirable that an image is formed by making the light beams incident on a pupil of an observer who uses the display apparatus.

According to a preferable aspect of the present invention, it is desirable that a diameter of each of the light beams from the plurality of light exit points is smaller than a diameter of the pupil of the observer.

Moreover, according to a preferable aspect of the present invention, it is desirable that the light exit points are disposed such that not less than one light beam and not more than four light beams among the plurality of light beams is/are incident on the pupil of the observer.

According to a preferable aspect of the present invention, it is desirable that an interval of the light exit points is larger by more than twice a size of the light exit point.

Moreover, according to a preferable aspect of the present invention, it is desirable that a diameter of the light beam which is incident on the pupil of the observer who uses the display apparatus is in a range from 0.5 mm to 2 mm.

According to a preferable aspect of the present invention, it is desirable that the light exit point is projected at a position of the pupil of the eye of the observer who uses the display apparatus by the micro lens array.

Moreover, according to a preferable aspect of the present invention, it is desirable that the light exit point is projected by the lens at a distance of more than 200 mm from a position of the lens.

According to a preferable aspect of the present invention, it is desirable that a size of each lens in the micro lens array is in a range from 50 μm to 500 μm.

Moreover, according to a preferable aspect of the present invention, it is desirable that a size of the pixel is not more than 500 μm.

According to a preferable aspect of the present invention, it is desirable that the light exit points are formed by apertures.

Moreover, according to a preferable aspect of the present invention, it is desirable that the apertures are provided on a mask.

According to a preferable aspect of the present invention, it is desirable that the mask is disposed at a position more toward the micro lens than a position of the pixel.

Moreover, according to a preferable aspect of the present invention, it is desirable that the pixel is formed by liquid crystals.

According to a preferable aspect of the present invention, it is desirable that the mask is disposed at a position where is more toward a light guide plate than a position of the liquid crystals.

Moreover, according to a preferable aspect of the present invention, it is desirable that a surface of the mask toward the light guide plate is constituted by a reflecting surface.

According to a preferable aspect of the present invention, it is desirable that the pixel is formed by an organic electroluminescence device.

Moreover, according a third aspect of the present invention, there can be provided an optical unit including a micro lens array which includes a plurality of lenses, and a mask having a plurality of apertures corresponding to the each lens.

According to a preferable aspect of the present invention, it is desirable that the mask is formed integrally with the micro lens array.

Moreover, according to a preferable aspect of the present invention, it is desirable that an image of the mask is projected by the lens at a distance of more than 200 mm from the lens.

According to a preferable aspect of the present invention, it is desirable that a size of the lens is in a range from 50 μm to 500 μm.

Moreover, according to a preferable aspect of the present invention, it is desirable that the micro lens array is made of a flexible material.

Moreover, according to a fourth aspect of the present invention, there can be provided a method of manufacturing display apparatus which displays an image having a plurality of pixels, including a step of providing a plurality of light exit points in a region corresponding to the pixel, and a step of forming a micro lens array near the plurality of light exit points.

According to a preferable aspect of the present invention, it is desirable that the plurality of light exit points is formed by printing on a pixel.

Moreover, according to a preferable aspect of the present invention, it is desirable that the method of manufacturing display apparatus includes a step of disposing a lens in the micro lens array corresponding to each pixel.

According to a preferable aspect of the present invention, it is desirable that the micro lens array is formed by nanoimprint technology.

Moreover, according to a preferable aspect of the present invention, it is desirable that the method of manufacturing display apparatus includes a step of joining the micro lens array to the pixel.

According to a preferable aspect of the present invention, it is desirable that a diameter of a light beam from the plurality of light exit points is smaller than a diameter of a pupil of an eye of an observer.

Moreover, according to a preferable aspect of the present invention, it is desirable that the light exit points are disposed such that not less than one light beam and not more than four light beams among the plurality of light beams is/are incident on the pupil of the observer.

According to a preferable aspect of the present invention, it is desirable that the diameter of the light beam incident on the pupil of the observer who uses the display apparatus is in a range from 0.5 mm to 2 mm.

Moreover, according to a preferable aspect of the present invention, it is desirable that the light exit point is projected at a distance of more than 200 mm from a position of the lens by the lens.

According to a preferable aspect of the present invention, it is desirable that a size of the lens is in a range from 50 µm to 500 µm.

Moreover, according to another preferable aspect of the present invention, there can be provided an electronic equipment which includes the abovementioned display apparatus.

Moreover, according to still another aspect of the present invention, there can be provided a mobile electronic equipment which includes the abovementioned display apparatus.

Furthermore, according to still another aspect of the present invention, there can be provided a mobile telephone which includes the above mentioned display apparatus.

According to a preferable aspect of the present invention, it is desirable that the mobile telephone includes a mail function.

Moreover, according to a preferable aspect of the present invention, it is desirable that the mobile telephone includes a camera function.

Moreover, according to another aspect of the present invention, there can be provided an image pickup apparatus which includes the above mentioned display apparatus.

According to a preferable aspect of the present invention, it is desirable that the image pickup apparatus is provided with a switch for setting capturing (photography) conditions.

The present invention shows an effect that there can be provided a display method in which focusing is easy, a display apparatus or an optical unit in which such display method is used, a method of manufacturing display apparatus, and an electronic equipment in which such display apparatus is installed.

DETAILED DESCRIPTION OF THE PREFERRED EMBODIMENTS

Exemplary embodiments of the present invention will be described below in detail by referring to the accompanying diagrams. However, the present invention is not restricted to the embodiments described below.

First Embodiment

In a camera, it is well known that a depth of field increases when the diaphragm of a lens is narrowed, and that a picture in focus from a near point to a distant point can be obtained. Therefore, the increased depth of field by narrowing a pupil of an observer artificially makes it possible to focus at the near point difficult to focus for a person having farsightedness due to old age (presbyopia eye).

FIG. 1, FIG. 2, FIG. 3, and FIG. 4 show a change in the depth of field when a pupil diameter changes from 4 mm to 0.5 mm. Generally, the diameter of the pupil of a human being is about 3 mm in a bright environment. As it becomes dark, the pupil diameter is increased to 5 mm to 7 mm.

Figure 1:
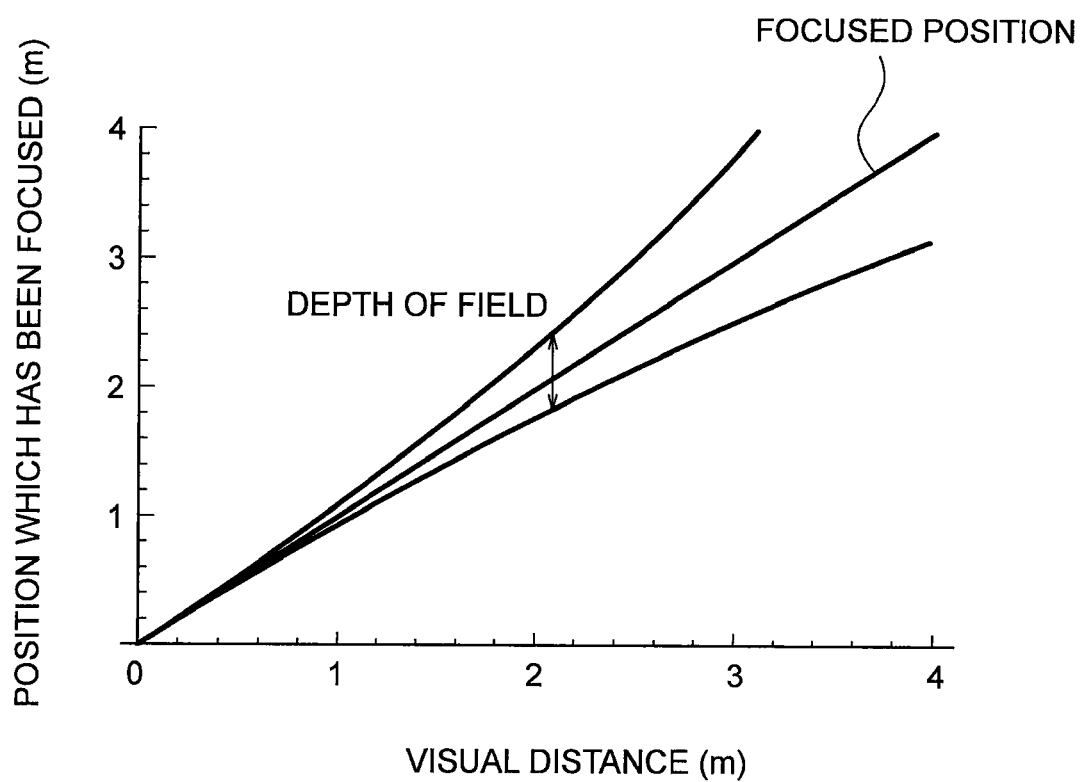
FIG. 1 is a diagram showing a depth of field.
Figure 2:
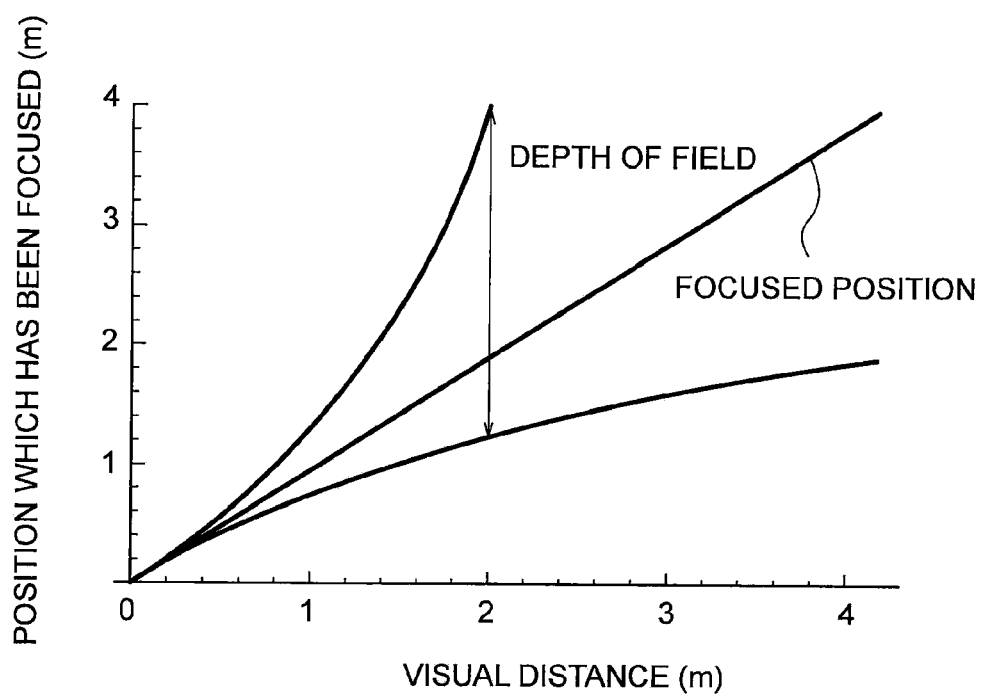
FIG. 2 is another diagram showing the depth of field.
Figure 3:
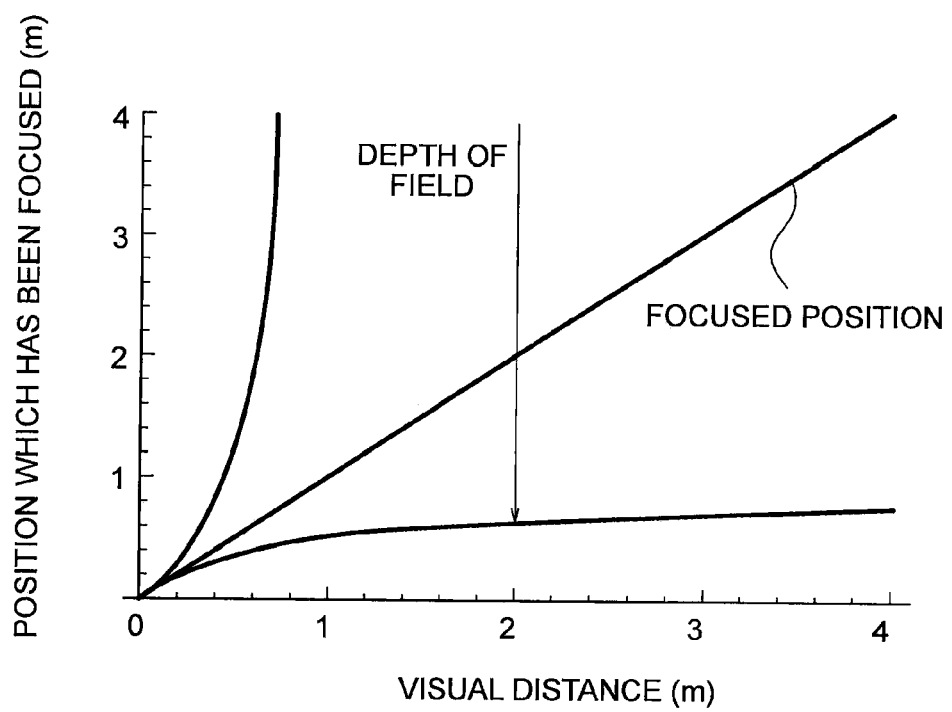
FIG. 3 is still another diagram showing the depth of field.
Figure 4:
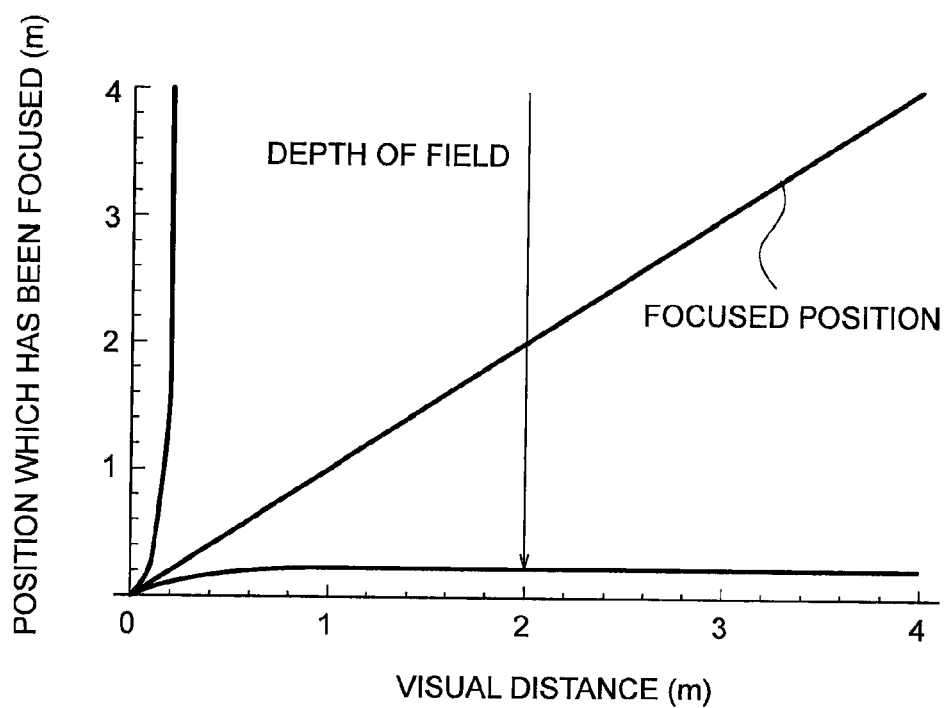
FIG. 4 is still another diagram showing the depth of field.

FIG. 1 shows the depth of field when the pupil diameter is 4 mm. For instance, the figure shows that we can focus in a range from 1.7 m to 2.4 m when our eye focuses at a distance of 2 m (visual distance 2 m in FIG. 1). FIG. 2 shows the depth of field when the pupil diameter is 2 mm. It is revealed that we can focus in a range from 1.2 m to 4 m when our eye focuses at a distance of 2 m. We can focus in a range from 0.7 m to 1.5 m when our eye focuses at a distance of 1 m. FIG. 3 shows the depth of field when the pupil diameter is narrowed to 1 mm. When our eye focuses at a distance of 2 m in the same way, it is revealed that we can focus in a range from 0.5 m to infinity (∞). Therefore, even a farsighted person due to an old age (presbyopic person) who can focus only up to 2 m is able to focus to a display of 0.5 m by narrowing the pupil of the eye to 1 mm. FIG. 4 shows the depth of field when the pupil diameter is narrowed down to 0.5 mm. FIG. 4 shows that wherever our eye focuses beyond 0.2 m, we can focus at a distance from 0.2 m up to infinity (∞). In this manner, when the diameter of the pupil of the eye is small, the depth of field is large. However, on the other hand, when the pupil diameter becomes small, a resolution of the eye is decreased.

The angular resolution θ of an eye is obtained by the following expression (1).

$$\theta = \lambda / \quad (1)$$

where, the pupil diameter is denoted by and the wavelength is denoted by λ.

Therefore, the resolution (diffraction limit) for the pupil of diameter 2 mm corresponds to visual acuity of almost 20/20 vision (at the wavelength is 0.55 μm). When the pupil is narrowed to 1 mm, the visual acuity is decreased to 20/40 vision. However, since it is kept a resolution of about 0.17 mm at a position away from 300 m. There is no problem in general.

When the pupil diameter is narrowed down to 0.5 mm, the visual acuity is decreased to about 20/80 vision. In this case, the resolution is decreased to about 0.33 mm at the position away from 300 m. At such level, it is possible to see a character of which size is about 3 mm. However, when the pupil diameter is narrowed down to 0.2 m, the visual acuity is decreased to about 20/200 vision. In this case, the resolution is decreased to 0.9 mm at the position away from 300 m. Therefore, the pupil diameter can be narrowed down to about 0.5 mm as lower limit.

Figure 5:
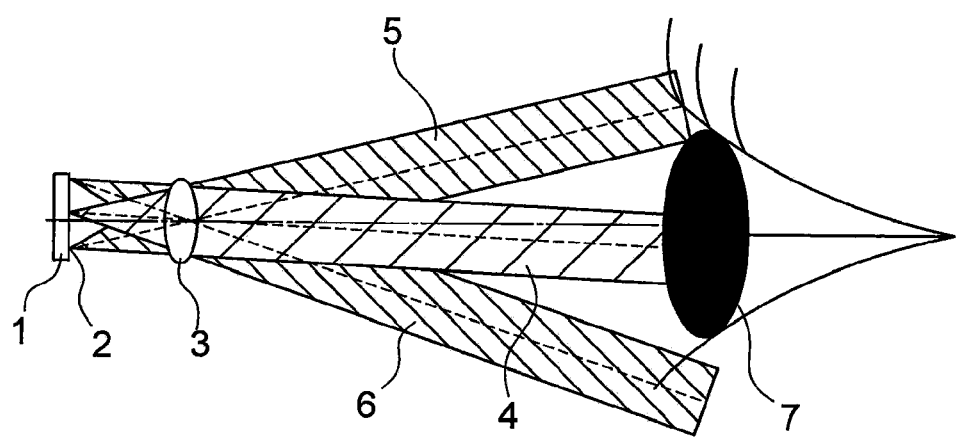
FIG. 5 is a diagram explaining a basic concept of a display method and a basic concept of a display apparatus.

FIG. 5 is a diagram showing a basic concept of a display method and a basic concept of a display apparatus according to this embodiment. An image is formed by a plurality of pixels. Pixel 1 in FIG. 5 is one of the pixels constituting the image. Since pixel 1 has a finite area, a plurality of light beams is emerged from a plurality of light exit points which exist in this area. In FIG. 5, it is shown as to how a light beam 5 emerges from a light exit point 2, and light beams 4 and 6 emerge from the other light exit points. The light beams 4, 5 and 6 are incident on a micro lens 3. Moreover, the light beam 4 is projected on a pupil of an observer by the micro lens 3. In FIG. 5, a diameter of the micro lens 3 is set to become smaller than the pupil diameter. Therefore, the light beams 4, 5 and 6 have a size (diameter) which is restricted by a diameter of the micro lens 3. In the following description, "to be projected on the pupil" includes a concept which is equivalent to "to be projected at infinity (∞)".

Here, the light exit point corresponds to a light emitting point itself in the case of a self-emitting display such as an organic EL. Whereas, in the case of a transmission-type by backlight such as a liquid-crystal panel, light transmission points which are restricted by a mask having a plurality of aperture portions correspond to the light exit points.

The light beams 4, 5, and 6 from the pixel 1 are directed toward a pupil 7 of the observer. In the present embodiment, only the light beam 4 among the light beams is incident on the pupil 7. Therefore, the depth of field is determined by the light beam 4 having a diameter smaller than the pupil diameter.

In addition, a part of light of the light beam 5 is incident on the pupil 7. Though a part of light can be incident on the pupil in this manner, an effect on decreasing the depth of field is minimal since an amount of the part of light is small. Therefore, it does not cause a problem such that the part of the light beam 5 is incident on the pupil. For observing a pixel, it is necessary that at least one light beam which has been restricted is incident on the pupil. However, when a large number of light beams are incident, the depth of field becomes small. Therefore, it is preferable that the light beams which are incident are four light beams at most.

The breakdown of the four light beams is, one light beam (corresponds to the light beam 4) with the entire light amount incident, and three light beams (correspond to the light beam 5) with a part of the light amount in the light beam slightly incident on the pupil. The light beam with the entire light amount incident contributes to a brightness of an image as well as increases the depth of field. Meanwhile, since an amount of light of the light beam with a part of the light incident is substantially small, the effect on decreasing the depth of field is minimal. However, this light beam contributes slightly to the brightness of the image. Accordingly, for securing the brightness of the image while maintaining the depth of field to be large, it is preferable that there are four light beams. Moreover, for convenience of arrangement of the light exit point 2 provided to the pixel 1, about four light beams can be incident on the pupil 7. It is not necessary that a shape of this light exit point is a point shape. The shape of this exit point may be a finite shape.

Moreover, when an intensity distribution in a cross-section of the light beam (a plane perpendicular to the light beam) is uniform, the boundary of the light beam is clearly defined. Such light beam may as well be used but the intensity distribution can not be uniform. Namely, alight beam of which the boundary is not necessarily clear may also be used. For instance, a light intensity distribution of the light beam may also be Gaussian distribution such as a laser. Even in the case of Gaussian distribution, since the central intensity is large, an effect same as of a normal light beam is achieved. A beam diameter in the case of the Gaussian distribution can be considered to be full width at half maximum equivalently. Moreover, even in a case such as Gaussian distribution, the full width at half maximum (diameter at a position where the intensity is half, an average size in the case of a finite shape) may be the diameter of the light beam.

In this manner, in the display method according to the present embodiment, light emerged from each pixel 1 is projected as a light beam on the pupil 7 of the observer via the micro lens 3. Moreover, by making at least one of the light beams (such as the light beam 4) incident on the pupil 7 of the eye of the observer, the pupil diameter is decreased equivalently and thereby the depth of field is increased.

At the time of projecting the light beam, at least one light beam 4 is projected on the pupil 7. For increasing the depth of field, it is preferable that the diameter of the light beam incident on the pupil 7 of the observer is not more than 2 mm.

The case of preparing a projection light beam group of diameter 1 mm toward the pupil 7 is to be taken in to consideration. For this situation, a light exit point of a diameter of about 1 μm is to be provided. In this case, a projection magnification of the micro lens 3 is 1000 times. The light exit points are to be disposed at an interval of approximately 2 μm. An arrangement such as close packing is to be selected appropriately. When a size of the pixel 1 is 100 μm×100 μm, an area of projection becomes 100 mm×100 mm. Information displayed in that area on the display apparatus can be seen. When an observation distance is 300 mm, a focal length of the micro lens 3 becomes about 0.3 mm.

When the density of the light-beam group is small (adjacent light beams are excessively distant), the eye of the observer may be positioned between the adjacent light beams. In this case, there arises a situation in which the light beam does not enter the pupil. Therefore, it is desirable to set a distance between a certain light beam and a light beam adjacent to the certain light beam to be not more than the pupil diameter. When a usual pupil diameter is 3 mm, it is desirable that an interval between the light beams is equal to or lower than 3 mm. Moreover, for making the interval between the light beams 3 mm or less at a distance away from 300 mm, it is necessary that the angular interval between the light beams is 0.58 degrees or less. The angular interval denotes an angle between the nearest light beams. When such an arrangement is made, one of the light beams can be made to be incident on the pupil with certainty. Accordingly, there will not be problem such that the image cannot be observed due to the position of the eye of the observer with respect to the display apparatus. In other words, when the position of the eye of the observer is substantially in front of the display apparatus or right in front of the display, the observation of the image is possible with certainty.

The distance at which a person who has farsightedness due to old age has a difficulty in seeing an object is a close distance in many cases. Therefore, distance up to the observer is assumed to be 300 mm so as easy to see an object at the distance of about 300 mm. Therefore, it is preferable to project an image of the light exit point 2 at a position 300 mm ahead.

According to the application, even the distance of about 200 mm can also be taken into consideration. Since the focal length of the micro lens is small, this is almost equivalent to projecting the light exit point 2 at infinity. Moreover, it is preferable to set the size of the projected light exit point 2 is about 2 mm or is less than or equal to 2 mm.

Moreover, the size of the micro lens 3 is considered to be corresponding to the size of the pixel 1 respectively. Therefore, for carrying out a high definition display, it is preferable that the size of the micro lens 3 is less than or equal to 500 µm. Furthermore, the resolution at the time of seeing an object 300 mm away for a person having visual acuity of 20/20 vision is approximately 0.1 mm. Therefore, the preferable size (diameter or the length of one side) of the micro lens 3 is 0.05 mm that is half of 0.1 mm, or in other words about 50 µm.

Here, on the other hand, it is necessary to take into consideration also the spreading of a light due to diffraction. A spread angle $\psi$ by diffraction is expressed by the following expression (2)

$$\psi = \lambda/D \quad (2)$$

where, the wavelength is denoted by $\lambda$, and the size (diameter of length of one side) of an aperture is denoted by D.

Therefore, when observed at a distance Z, a size of the light beam spreads to the size expressed by the following expression (3).

$$= \lambda Z/D \quad (3)$$

When D=50 µm, it becomes =3.3 mm. In this manner, since the diameter of the light beam at the pupil position becomes almost same as the pupil diameter, it is revealed that an effect of decreasing the pupil diameter equivalently by a light beam vanishes. Therefore, it is preferable that the size of the micro lens 3 is 50 µm or more than 50 µm.

Moreover, the size of the micro lens is 165 µm in order to maintain the size of the light beam to be 1 mm on the pupil 7 when the observation distance is 300 mm. Accordingly, it is desirable that the size of the micro lens is in a range of 50 µm to 500 µm.

When the display device is an electronic device, there are pixels in these devices. An electronic device is such as a liquid-crystal panel or a plasma panel, and an electronic paper (a device which turns over micro particles by electrophoresis).

Whereas, for example, it is also possible that clear pixel does not exit such as a photographic print. In this case, a certain arbitrary minute area can be deemed as a pixel. This predetermined area is also called as a pixel in the present invention. Therefore, even in a photographic print without pixels, the present invention is applicable, and a similar display can be carried out.

In FIG. 5, a structure of a display device such as a liquid-crystal panel and a plasma panel which constitutes the pixel 1 is omitted. Even in the following diagrams, a structure for displaying information (such as ON, OFF, and shades) actually on a pixel is omitted.

Figure 6B:
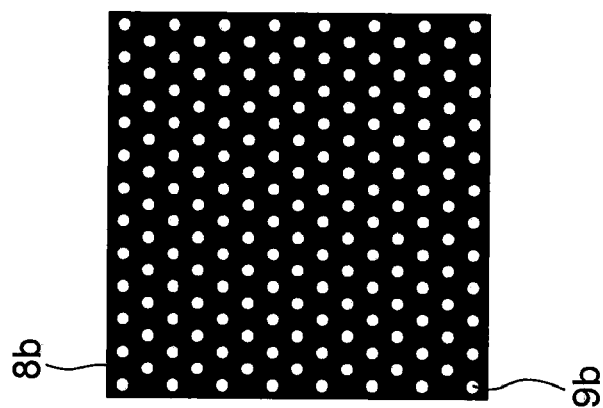
FIG. 6A and FIG. 6B are diagrams explaining examples of an arrangement of light exit points.
Figure 6A:
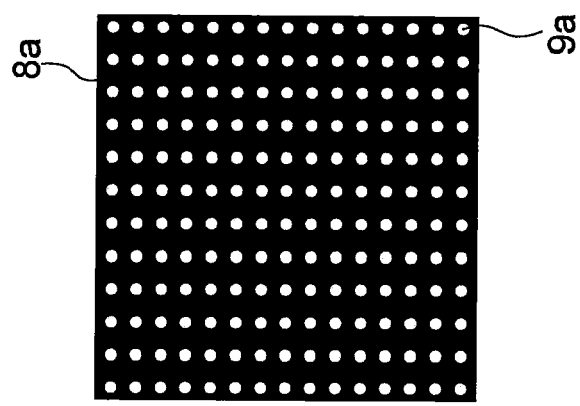

FIG. 6A and FIG. 6B show examples of an arrangement of light exit points 9a and 9b respectively. This is an example of light emitting points in the case of self-emitting display device. This corresponds to a mask structure in the case of a non self-emitting display device. Apertures 9a and 9b which restrict light beams incident on respective pupils are formed on masks 8a and 8b.

In these examples, the light emitting points or the apertures 9a and 9b are provided to be aligned. Without restricting to this, the light emitting points or the apertures 9a and 9b may be arranged randomly. Moreover, although the apertures 9a and 9b are shown to be circular-shaped in the diagram, they are not necessarily required to be circular shape. The light emitting points or the apertures 9a and 9b are distributed such that at least one light beam and not more than four light beams which have been restricted is/are incident on the pupil 7 of the observer when the light beams are projected toward the observer via micro lens 3 as shown in FIG. 5. Moreover, it is desirable that the diameter of the light beam at the time of passing through the pupil 7 becomes about 1 mm. When such an arrangement is made, it is possible to make one of the light beams incident on the pupil with certainty. Accordingly, there will not be problem such that the image cannot be observed due to the position of the eye of the observer with respect to the display apparatus. In other words, when the position of the eye of the observer is substantially in front of the display apparatus or right in front of the display, the observation of the image is possible with certainty.

Figure 7:
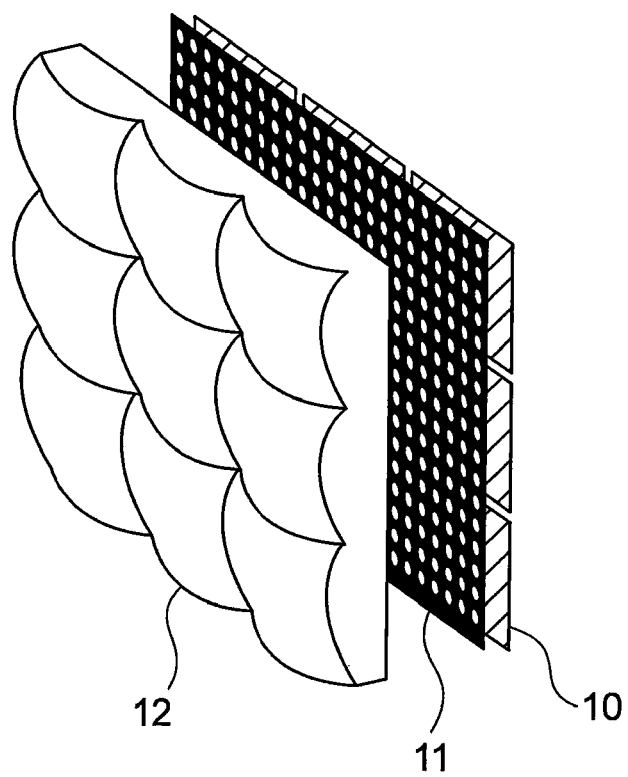
FIG. 7 is a diagram showing details of a pixel structure.

FIG. 7 shows details of a pixel structure. For the sake of simplicity, 3×3 pixels are shown. In the case of a self-emitting display such as a plasma panel, they are disposed in order of a pixel 10, a mask 11, and a micro lens array 12. In FIG. 7, a micro lens in the micro lens array 12 corresponds to each pixel. Without restricting to this arrangement, a plurality of micro lenses may correspond to one pixel.

Even in the self-emitting display device, in the case of a display device such as an organic EL in which the shape of a light emitting point can be set arbitrarily, the mask 11 is not necessary. Moreover, a liquid-crystal display panel may be used as the pixel 10. In the diagram, although the pixel 10, the mask 11, and the micro lens array 12 are shown to have spaces and distances in-between, these spaces and distances in-between are not required necessarily. The pixel 10, the mask 11, and the micro lens array 12 may be structured to be closely constituted integrally.

Figure 8:
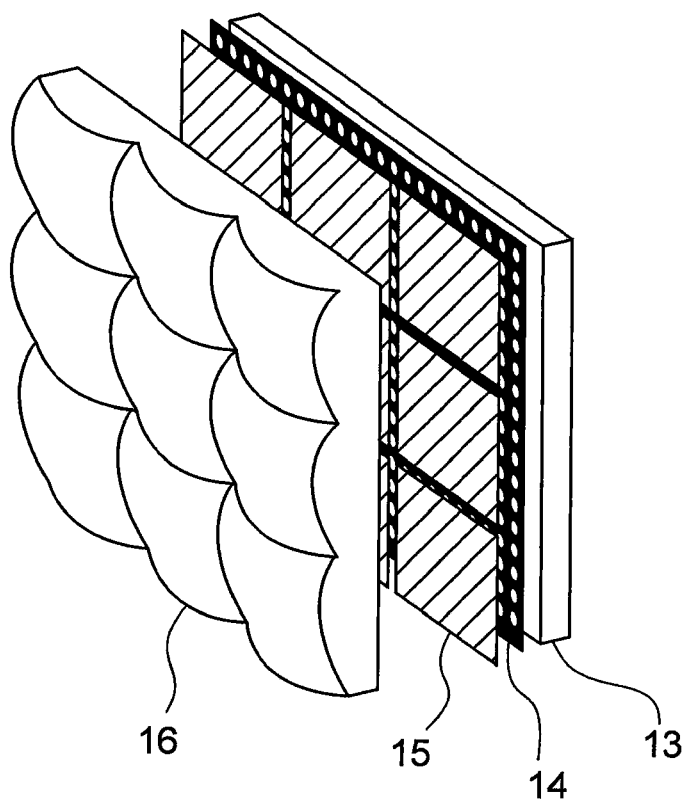
FIG. 8 is another diagram showing an example of the pixel structure.

FIG. 8 shows an example of another pixel structure. In the case of a display device such as a liquid-crystal panel (called as 'LCD' in general) which is non-self-emitting and needs a light source at a rear surface, an arrangement may be made in order of a light source 13, a mask 14, a pixel 15, and a micro lens array 16. The light source 13 may also be a light guide plate.

For the pixel 15, a pixel of the liquid-crystal panel is preferable. By making a surface of the mask 14 toward the light source (light guide plate) 13 be a reflecting surface, light which is shielded at the mask can be returned to the light guide plate. Accordingly, it is possible to use the light effectively.

It is preferable that a surface of the mask 14 toward the light guide plate is a reflecting surface. In the diagram, although the light source 13, the mask 14, the pixels 15, and the micro lens array 16 are shown to have spaces and distances in-between, these spaces and distances are not required necessarily. The light source 13, the mask 14, the pixels 15, and the micro lens array 16 may be structured to be closely contacted integrally. Moreover, in FIG. 7 and FIG. 8, although the pixels and the corresponding micro lenses are shown to be arranged in rows and columns vertically and horizontally, the arrangement is not restricted to such arrangement. It is desirable to match with a pixel arrangement of a display device which is to be used. Moreover, in the case of a display in which red (R), green (G), and blue (B) are used, either assigning of R, G, and B to the pixels or switching by dividing time (color sequential) is to be taken into consideration.

Second Embodiment

Figure 9:
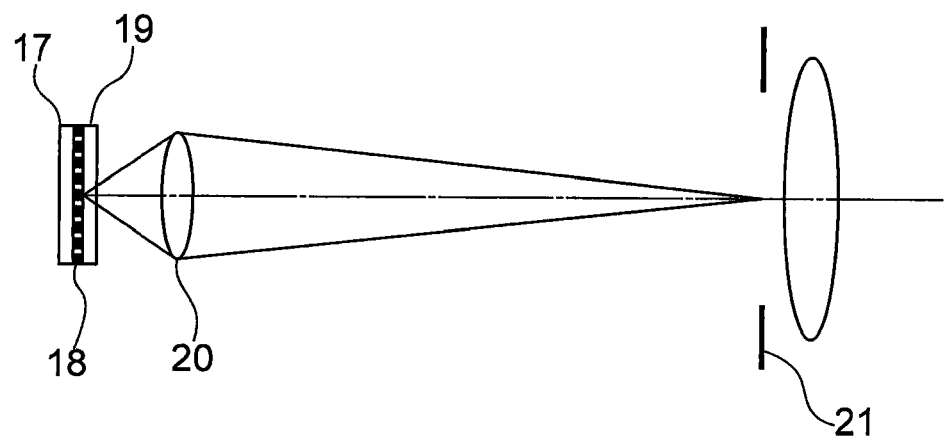
FIG. 9 is a diagram showing a display apparatus and a display method according to a second embodiment of the present invention.

Next, a display apparatus and a display method according to a second embodiment of the present invention will be described below. FIG. 9 shows an arrangement in which an image of a mask is projected on the pupil of the observer's eye. A mask 18 which is disposed in contact with a light guide plate 17, further the mask 18 is contacted with a pixel 19.

Although only one pixel is shown in FIG. 9, a display element is formed by a plurality of pixels similarly as mentioned in the first embodiment. A pixel 19 is a pixel of a liquid-crystal panel. Moreover, a surface of the mask 18 toward the light guide plate 17 is a reflecting surface. The mask 18 and an aperture group formed in the mask 18 are projected toward a pupil 21 of the observer by a micro lens 20. The mask 18 and the micro lens 20 may be disposed in order on a usual liquid-crystal panel.

Here, a case of making a projection-pupil group of a diameter 1 mm toward the pupil 21 is to be taken into consideration. For this, a mask having an aperture group of 1 μm is to be provided. In this case, the projection magnification of the micro lens 20 becomes 1000 times. The apertures are disposed at an interval of approximately 2 μm. An arrangement such as close packing is selected appropriately.

Figure 10:
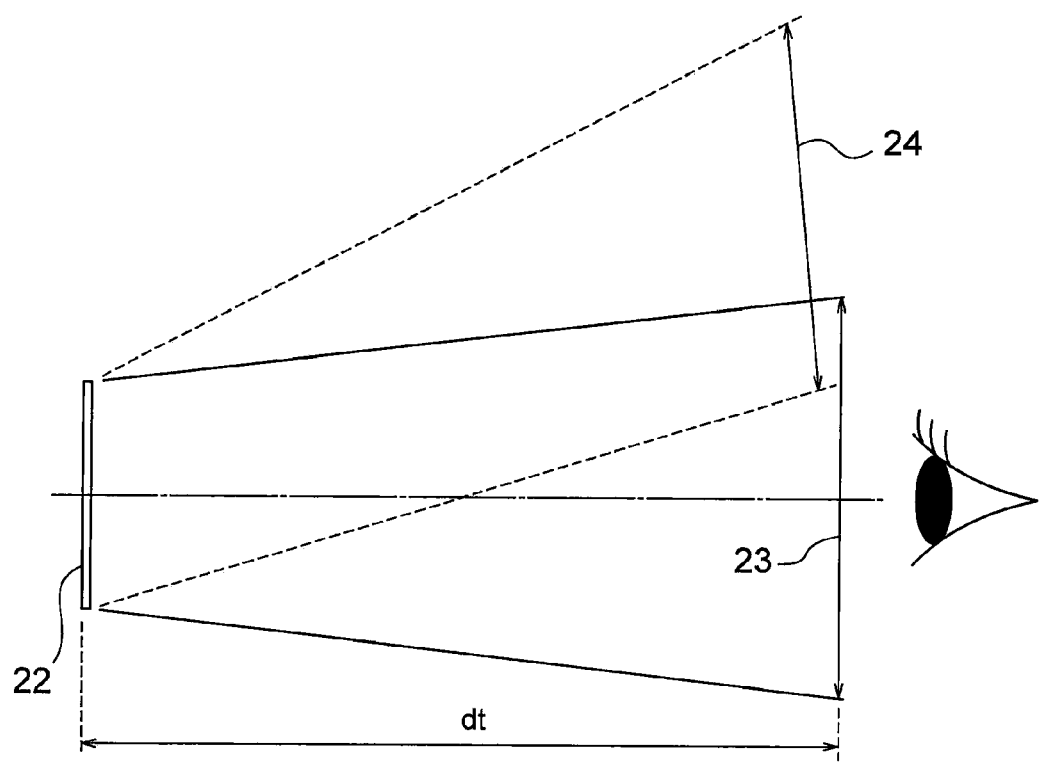
FIG. 10 is a diagram showing a region of information displayed on the display apparatus, which can be seen.

When a size of the pixel 19 is 100 μm×100 μm, an area of projection becomes 100 mm×100 mm. Information displayed in that area on the display apparatus can be seen. A schematic explanation is shown in FIG. 10. Information which is displayed on a display apparatus 22 according to the present invention can be seen by focusing at region 23. Since a mask of an adjacent pixel is projected in a region 24 other than the region 23, an image can be seen in that direction as well. The observer and the display apparatus are separated by a distance dt. When an observation distance is 300 mm, a focal length of the micro lens 20 becomes about 0.3 mm.

Third Embodiment

Figure 11B:
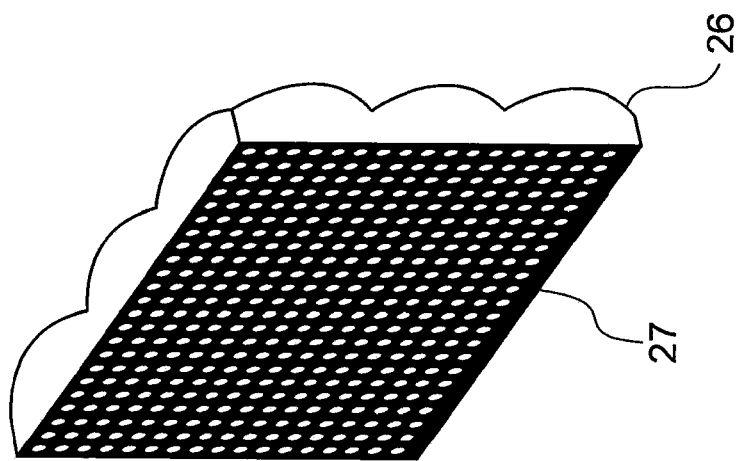
FIG. 11A and FIG. 11B are diagrams showing schematic structures of an optical unit according to a third embodiment of the present invention.
Figure 11A:
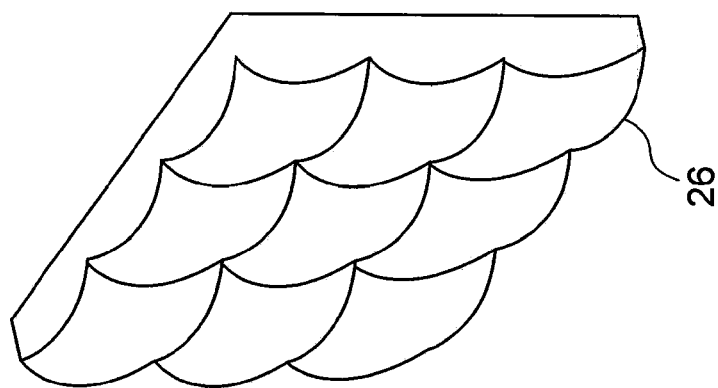

Next, a third embodiment of the present invention will be described below. FIG. 11A and FIG. 11B show schematic structures of an optical unit according to the third embodiment. Usually, a large number of micro lenses are provided. In this embodiment, 3×3 micro lenses of a large number of micro lenses are shown. This is a plate which is formed by a micro lens array 26 and a mask 27.

FIG. 11A and FIG. 11B are diagrams of the optical unit viewed from the front side and rear side respectively. Constituent of the micro lens array 26 and the mask 27 are similar as in the previous embodiments. In other words, a plurality of mask apertures exists in one micro lens.

The micro lens projects frontward an image of the mask 27 having the apertures. Moreover, a focal length of the micro lens, a distance between the micro lens and the mask, a size of the mask, and density of apertures in the mask are set to be such that one or more than one apertures are projected on the pupil of the observer. It is preferable to match a projection distance by the mask 27 and the micro lens to a distance at which the observer observes.

By installing the optical unit which includes the micro lens array 26 and the mask 27 in a display device, it is possible to increase a depth of field of the observer's eye. Therefore, it is possible to see a focused image even for a person having farsightedness due to old age. The display device includes a paper medium such as a photographic print and a newspaper apart from an electronic device such as a liquid-crystal panel.

It is preferable to provide the mask directly integrally toward a plane of the micro lens array 26. For example, it can be taken into consideration such that applying a chrome coating on the micro lens array 26 and forming the apertures by etching. Moreover, it is also possible to make the micro lens array 26 of a material having flexibility, for example a soft material such as plastic. Accordingly, it is applicable to a flexible display.

Numerical examples are cited below.

When the aperture of the mask is 2 μm, for making a light beam of 1 mm incident on the observer's eye, the projection magnification of the micro lens becomes 500 times. When the distance up to the observer is 300 mm, the focal length of the micro lens becomes 0.6 mm. The mask 27 is placed at a focal position of the micro lens 26. When placed at the focal position, it is an infinite projection. But since the focal length of the lens is small, it is equivalent even in a case of projecting 300 mm ahead.

Let the size (length of one side) of the micro lens and the size of the pixel are 150 μm. In this case, an image can be observed in a region of 75 mm×75 mm. When an interval between the mutually nearest apertures is 6 μm, it is a 3 mm interval at the position of the observer. When the pupil is moved by 3 mm, a light beam generated at an adjacent aperture is seen. An angle between the light beams at this time is approximately 0.57 degrees.

When an aperture of the mask 27 is 5 μm, for making a light beam of 1.5 mm incident on the observer's pupil, the projection magnification of the micro lens becomes 300 times. When the distance up to the observer is 300 mm, the focal length of the micro lens becomes 1 mm. The mask 27 is placed at a focal position of the micro lens. When placed at the focal position, it is an infinite projection, and since the focal length of the lens is small, it is equivalent even in a case of projecting at a position 300 mm ahead.

When the size (length of one side) of the micro lens and the size of the pixel are 200 μm, the image can be observed in a region of 60 mm×60 mm. When an interval between the mutually nearest apertures is 10 μm, the interval at the position of the observer becomes 3 mm. When the pupil is moved by 3 mm, alight beam generated at an adjacent aperture is seen. An angle between the light beams at this time is approximately 0.57 degrees.

When the aperture of the mask 27 is 10 μm, for making a light beam of 2 mm incident on the observer's pupil, the projection magnification of the micro lens becomes 200 times. When the distance up to the observer is 300 mm, the focal length of the micro lens becomes 1.5 mm. The mask 27 is placed at a focal position of the micro lens. When placed at the focal position, it is an infinite projection. Since the focal length of the lens is small, it is equivalent even in the case of projecting at 300 mm ahead.

When the size (length of one side) of the micro lens and the size of the pixel are 200 μm, the image can be observed in a region of 40 mm×40 mm. When an interval between the mutually nearest apertures is 15 μm, the interval at the position of the observer becomes 3 mm. When the pupil is moved by 3 mm, a light beam generated at an adjacent aperture is seen. An angle between the light beams at this time is approximately 0.57 degrees.

When the aperture of the mask 27 is 15 µm, for making a light beam of 1.5 mm incident on the observer's pupil, the projection magnification of the micro lens is 100 times. When the distance up to the observer is 300 mm, the focal length of the micro lens becomes 2.97 mm. The mask 27 is placed at a focal position of the micro lens. When the mask is placed at the focal position, it is an infinite projection. But since the focal length of the lens is small, it is equivalent even in the case of projecting at 300 mm ahead.

When the size (length of one side) of the micro lens and the size of the pixel are 500 µm, the image can be observed in a region of 50 mm×50 mm. When an interval between the mutually nearest apertures is 30 µm, the interval at the position of the observer becomes 3 mm. When the pupil is moved by 3 mm, alight beam generated at an adjacent aperture is seen. An angle between the light beams at this time is approximately 0.57 degrees.

When the aperture of the mask 27 is 20 µm, for making a light beam of 2 mm incident on the observer's pupil, the projection magnification of the micro lens is 100 times. When the distance up to the observer is 300 mm, the focal length of the micro lens becomes 2.97 mm. When the size (length of one side) of the micro lens and the size of the pixel are 250 µm, the image can be observed in a region of 25 mm×25 mm.

Fourth Embodiment

Figure 12B:
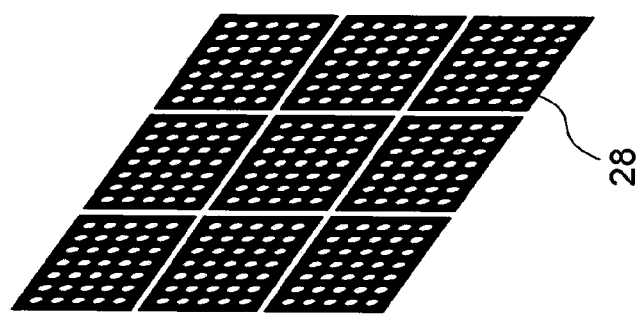
FIG. 12A and FIG. 12B are diagrams showing schematic structures of a display apparatus according to a fourth embodiment of the present invention.
Figure 12A:
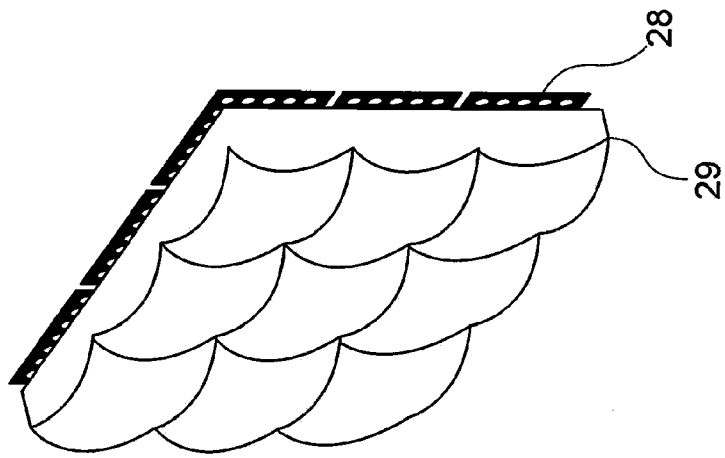

Next, a fourth embodiment of the present invention will be described below. FIG. 12A and FIG. 12B are diagrams showing schematic structures of a display apparatus according to the fourth embodiment. Usually a large number of micro lenses are formed. Here, for sake of simplicity, 3×3 micro lenses are shown. FIG. 12B shows a pixel 28 made of an organic EL device.

An organic EL is a self-emitting element, and a plurality of light-emitting points is formed in a pixel. The light emitting points and the micro lens of the micro lens array 29 shown in FIG. 12A generate a large number of highly directional restricted light beams. The light beams are incident on the observer's eye as the light beam shown in FIG. 5, decreasing the observer's pupil diameter equivalently and increasing the depth of field. In the case of such organic EL, the depth of field of the observer can be increased by a simple structure without using a mask. It is obvious to restrict by a mask according to the size of the light emitting points of the organic EL.

Numerical examples are cited below.

When the size of the light emitting point of the organic EL device is 2 µm, for making a light beam of 2 mm incident on the observer's pupil, the projection magnification of the micro lens becomes 1000 times. When the distance up to the observer is 250 mm, the focal length of the micro lens becomes 0.25 mm. When the size (length of one side) of the micro lens and the size of the pixel are 100 µm, the image can be observed in a region of 100 mm×100 µm.

When the size of the light emitting point of the organic EL device is 10 µm, for making a light beam of 1 mm incident on the observer's eye, the projection magnification of the micro lens becomes 100 times. When the distance up to the observer is 300 mm, the focal length of the micro lens becomes 3 mm. When the size (length of one side) of the micro lens and the size of the pixel are 500 µm, the image can be observed in a region of 50 mm×50 mm.

Fifth Embodiment

Figure 13A:
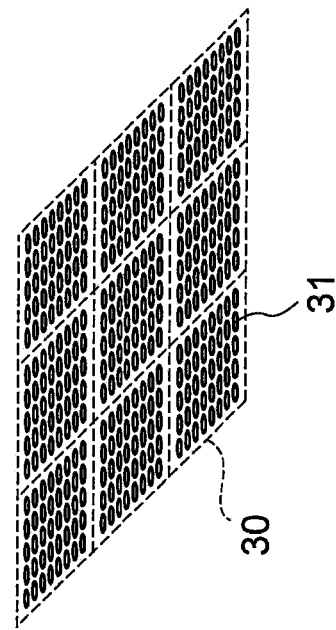
FIG. 13A and FIG. 13B are diagrams showing a display apparatus and a method of manufacturing display apparatus according to a fifth embodiment of the present invention.
Figure 13B:
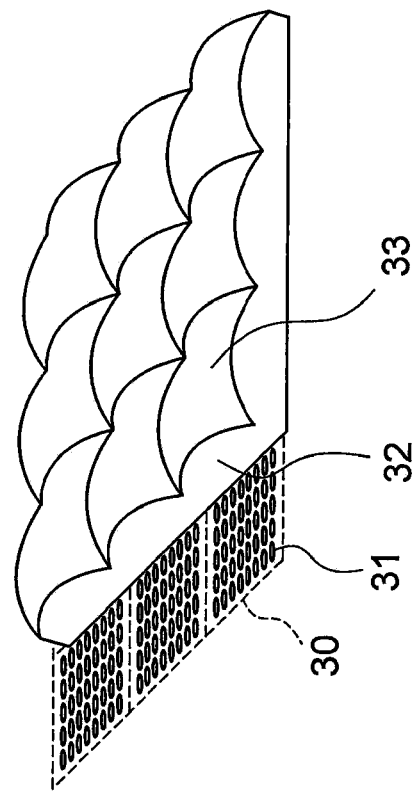

Next a fifth embodiment of the present invention will be described below. FIG. 13A and FIG. 13B show a display apparatus and a method of manufacturing display apparatus according to the fifth embodiment. In this invention, the display apparatus and the display device include a photograph and a printed matter in addition to the liquid-crystal and the organic EL mentioned above. In the fifth embodiment, the display device is a printed matter.

For the sake of simplicity, only a portion corresponding to 3×3 pixels is shown. Firstly, a value of information (such as shading and color) is displayed on a medium such as paper by printing minute dots 31 in a region 30 corresponding to each pixel. A thin lens material 32 is applied thereon. Thereafter, a micro lens array 33 is formed by a technology such as nanoimprint.

Here, it may be stuck on the pixel after forming the micro lens array 33 first. Moreover, the micro lens may be constituted at the time of transferring a transparent material on the medium on which the information is displayed.

The minute dots 31 correspond to light exit points, and reflect light from a front surface, or, allow light to transmit from a rear surface. An operation and an effect are similar as in the embodiments described above.

In this manner, it is possible to provide a printed matter with a deep depth of field at about same cost as of printing. In other words, it is possible to provide a printed matter which person having farsightedness due to old age or a nearsighted person can see easily.

Sixth Embodiment

Figure 14:
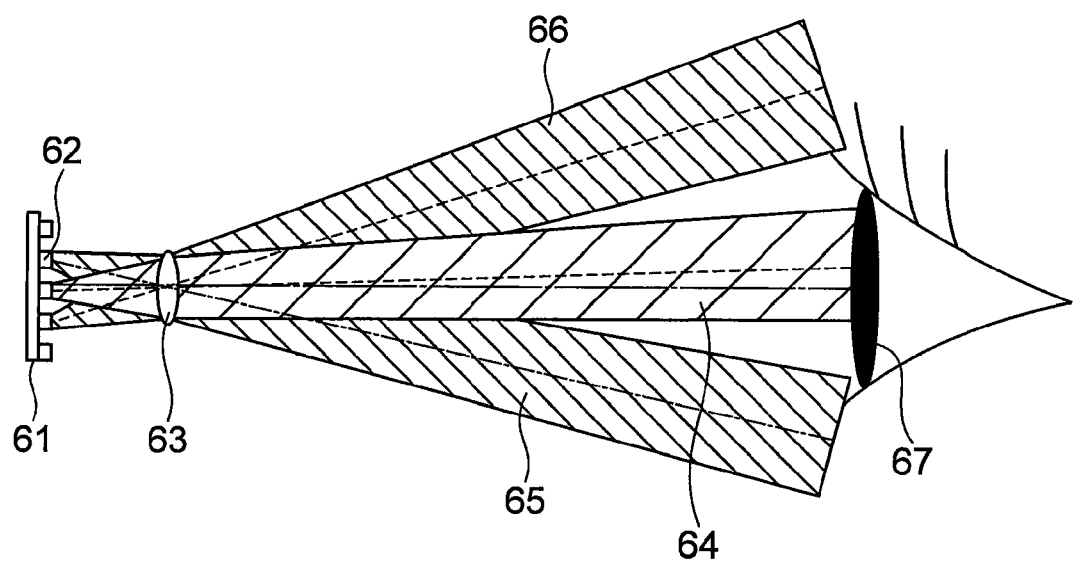
FIG. 14 is a diagram showing a basic concept of a display method and a basic concept of a display apparatus according to a sixth embodiment of the present invention.

FIG. 14 shows a basic concept of a display method and a basic concept of a display apparatus according to a sixth embodiment of the present invention. An image is formed by a plurality of pixels.

In FIG. 5 mentioned above, the basic concept has been described schematically. In FIG. 5, for explaining the concept in an easily understandable manner, the diameter of the micro lens restricts the light beam. However, in FIG. 14, the description will be carried out upon taking into consideration an actual operation of the micro lens.

A pixel 61 in FIG. 14 indicates one of the pixels forming the image. Since the pixel 61 has a finite area, a plurality of light beams is emerged from a plurality of light exit points existing in this area. FIG. 14 shows the light emerged from light exit points 62 becomes a light beam 65 by a lens 63 of a micro lens array. Moreover, FIG. 14 also shows light emerged from the other light exit points becomes light beams 64 and 66 by the lens 63. In this manner, the light emerged from the light exit point becomes the light beam 64 by the lens 63, and is incident on a pupil 67 of the observer.

Here, a diameter of the micro lens array is extremely smaller as compared to a pupil diameter. Moreover, the micro lens array and the pixel (light exit points) are in proximity. Therefore, it is equivalent that an image the light exit point is formed on the pupil 67 of the observer by the lens 63. Moreover, since a focal length of the lens 63 is extremely small as compared to a distance up to the observer, "projecting on the pupil" is a concept includes a meaning that is same as projecting the light emerged from the light exit point at infinity (∞) as in the following description.

Here in the case of a self-emitting display such as the organic EL, the light exit point is a light emitting point itself. Whereas, in the case of a transmission type by back light, such as a liquid-crystal panel, a light transmission point having a plurality of apertures restricted by a mask corresponds to the light exit point.

The light beams 64, 65, and 66 from the pixel 61 are directed toward the pupil 67 of the observer. In other words, exit points of the pixel 61 are formed as an image at a position (distance from the lens) of the pupil 67 of the observer by the lens 63. Moreover, in this example, only the light beam 64 among the plurality of light beams is incident on the pupil 67. Therefore, the depth of field is determined by the light beam 64 having a diameter smaller than the pupil diameter.

Moreover, a part of the light beam 65 is incident on the pupil 67. In this manner, although the part of light is incident, since a light amount is small, an effect of making the depth of field decrease is small. Therefore, the incidence of the part of the light beam 65 on the pupil would not be any problem. For observing the pixel, it is necessary that at least one light beam which is restricted is incident on the pupil. However, when a large number of light beams is incident, the depth of field becomes smaller. Therefore, it is preferable that there are at the most four light beams which are incident.

A breakdown of the four light beams is, one light beam (corresponds to the light beam 64) of which the entire amount of light is incident, and three light beams (correspond to light beam 65) of which a part of an amount of light is incident slightly on the pupil. The light beam of which the entire amount of light is incident contributes to brightness of image as well as increase of the depth of field. Meanwhile, since the light beam of which a part of the amount of light is incident, has a small amount of light, the effect on making the depth of field decrease is small. Therefore, for maintaining the depth of field to be increased, it is preferable that there are less than or equal to four light beams. Moreover, for the arrangement of the light exit points 62 provided on the pixel 61, about four light beams can be incident on the pupil 67. Additionally the light exit point is not necessarily required to be a point and may have a finite shape.

Moreover, when an intensity distribution in a cross-section of the light beam is uniform, a boundary of the light beam is clear. Such light beam may be used. Moreover, without restricting to this, the intensity distribution may not be uniform. In other words, a light beam of which the boundary is not clear may also be used.

For instance, an optical intensity of the light beam can be of Gaussian distribution as in laser. Even in the case of Gaussian distribution, since the central intensity is high, an effect same as of a usual light beam is obtained. A diameter of the light beam of Gaussian distribution can be considered to be a full width at half maximum equivalently. Moreover, even in the case of Gaussian distribution, (in the case of a distribution similar to Gaussian distribution), the full width at half maximum (diameter where the intensity becomes half, and in the case of a finite shape, an average size) may be the diameter of the light beam.

In this manner, in the display method according to the sixth embodiment, light emerged from each pixel 61 is projected as a light beam on the pupil 67 of the observer via the lens 63 of the micro lens array. Moreover, by making at least one (such as the light beam 64) of the light beams incident on the pupil 67 of the pupil of observer's eye the pupil is decreased equivalently, and the depth of field is increased.

At the time of projecting the light beam, at least one light beam 64 is projected on the pupil 67. For increasing the depth of field, it is preferable that the diameter of the light beam incident on the pupil 67 of the observer is less than or equal to 2 mm.

A case of preparing a projected light beam group of diameter 1 mm toward the pupil 67 is taken into consideration. For this, a light exit point having diameter of about 1 μm is provided. In this case, projection magnification of a lens 3 becomes 1000 times. The light exit points are disposed at an interval of approximately 2 μm. An arrangement such as close packing is selected appropriately. When an observation distance is 300 mm, the focal length of the lens 3 becomes about 0.3 mm.

However, when the interval of the light exit points becomes excessively small, the large number of light beams enters the pupil simultaneously. Therefore, an effect of narrowing the pupil is reduced. Therefore, it is desirable that the interval of the light exit points is larger than twice the size of the light exit point. Here, the interval of the light exit points is a distance between centers of the light exit points.

When a density of the light beam group is small (adjacent light beams are too distant), sometimes, the observer's eye is positioned between the adjacent light beams. In this case, a situation in which the light beam does not enter the pupil arises. Therefore, it is desirable to set the interval between a certain light beam and a light beam adjacent to the certain light beam is less than or equal to the pupil diameter. When the usual pupil diameter is 3 mm, it is desirable that the interval of the light beams is less than or equal to 3 mm. Moreover, for making the interval of the light beams at 300 mm ahead be 3 mm or less, it is necessary that an angular interval of the light beams is less than or equal to 0.58 degrees. The angular interval denotes an angle between the light beams which are nearest each other. When such an arrangement is made, it is possible to make one among the plurality of light beams incident on the pupil with certainty. Therefore, the problem does not arise such that an image cannot be observed according to the position of the observer's eye with respect to the display apparatus. In other words, when the position of the observer's eye is substantially in front of the display apparatus or right in front of the display apparatus, the image can be observed with certainty.

The person having farsightedness due to old age has a difficulty in seeing an object at a short distance. Therefore, in order to easy to see an object at the distance of about 300 mm, the distance up to the observer is considered to be 300 mm. Therefore, it is preferable to project an image of the light exit point 62 at 300 mm ahead.

The distance of 200 mm may also be taken into consideration as an application. Since the focal length of the lens 63 is small, it is almost equivalent to projecting the light exit point 62 at infinity. Moreover, when the light exit point 62 is projected, it is preferable that the size of the light exit point 62 is set to about 2 mm or less than 2 mm.

Moreover, the size of the lens 63 is a factor to determine a resolution similar to the size of pixel. Therefore, for carrying out a high definition display, it is preferable that the size of the lens 63 is 500 μm or smaller than 500 μm. Furthermore, the resolution of a person having 20/20 vision for seeing an object 300 mm ahead is approximately 0.1 mm. Therefore, it is preferable that the size (diameter or length of one side) of the lens 63 is half of that, which is 0.05 mm, or in other words, about 50 μm.

Here, it is necessary to take into consideration spreading of a light beam due to diffraction on the other hand. A spreading angle ψ due to diffraction is expressed by the following expression (2).

$$\psi = \lambda/D \quad (2)$$

where, wavelength is denoted by λ and the size (diameter or length of one side) of aperture is denoted by D.

Therefore, a size of the light beam when observed at a distance Z is spread to a size expressed by the following expression (3).

$$=\lambda Z/D \quad (3)$$

When D=50 μm, becomes 3.3 mm. In this manner, when D=50 μm, since the beam diameter at the pupil position is almost same as the pupil diameter. It is revealed that an effect of decreasing the pupil diameter equivalently by the light beam almost vanishes. Therefore, it is preferable that the size of the lens 63 is 50 μm or larger than 50 μm.

Moreover, when the observation distance is 300 mm, the size of the lens is 165 μm for maintaining the size of the light beam at 1 mm on the pupil 67. Accordingly, it is desirable that the size of the lens is in a range from 50 μm to 500 μm.

When the display device is an electronic device, there are pixels in such devices. The electronic device means a device such as a liquid-crystal panel, a plasma panel, and an electronic paper (a device which turns over micro particles by electrophoresis).

Whereas, for example, it is also possible that clear pixel does not exit such as a photographic print. In this case, a certain arbitrary minute area can be deemed as a pixel. This predetermined area is also called as a pixel in the present invention. Therefore, even in a photographic print without pixels, the present invention is applicable, and a similar display can be carried out.

In FIG. 14, a structure of a display device such as a liquid-crystal panel and a plasma panel which forms the pixel 61 is omitted. Even in the following diagram, a structure for displaying information (such as ON, OFF, and shades) practically on a pixel is omitted.

FIG. 6A and FIG. 6B show examples of the arrangement of the light exit points 9a and 9b respectively. This is an example of light emitting points in the case of a self-emitting display device. This corresponds to the mask structure in the case of a non self-emitting display device. The apertures 9a and 9b which restrict light beams incident on respective pupils are provided to the masks 8a and 8b.

In these examples, the light emitting points or the apertures 9a and 9b are provided to be aligned. Without restricting to this, the light emitting points or the apertures 9a and 9b may be arranged randomly. Moreover, although the apertures 9a and 9b are shown to be circular-shaped in the diagram, they are not necessarily required to be circular shape. The light emitting points or the apertures 9a and 9b are distributed such that at least one light beam and not more than four light beams which have been restricted is/are incident on the pupil 67 of the observer when a light beam is projected toward the observer by the micro lens 63 shown in FIG. 14. Moreover, it is desirable that the diameter of the light beam at the time of passing through the pupil 67 becomes about 1 mm. When such an arrangement is made, it is possible to make the light beam 61 of the plurality of light beams incident on the pupil with certainty. Accordingly, there will not be problem such that the image cannot be observed due to the position of the eye of the observer with respect to the display apparatus. In other words, when the position of the eye of the observer is substantially in front of the display apparatus or right in front of the display, the observation of the image is possible with certainty.

In FIG. 14, for the sake of simplicity, the description has been made by representing one pixel and one lens. However, the pixels and the lenses are not necessarily required to be corresponding one-to-one.

Figure 15:
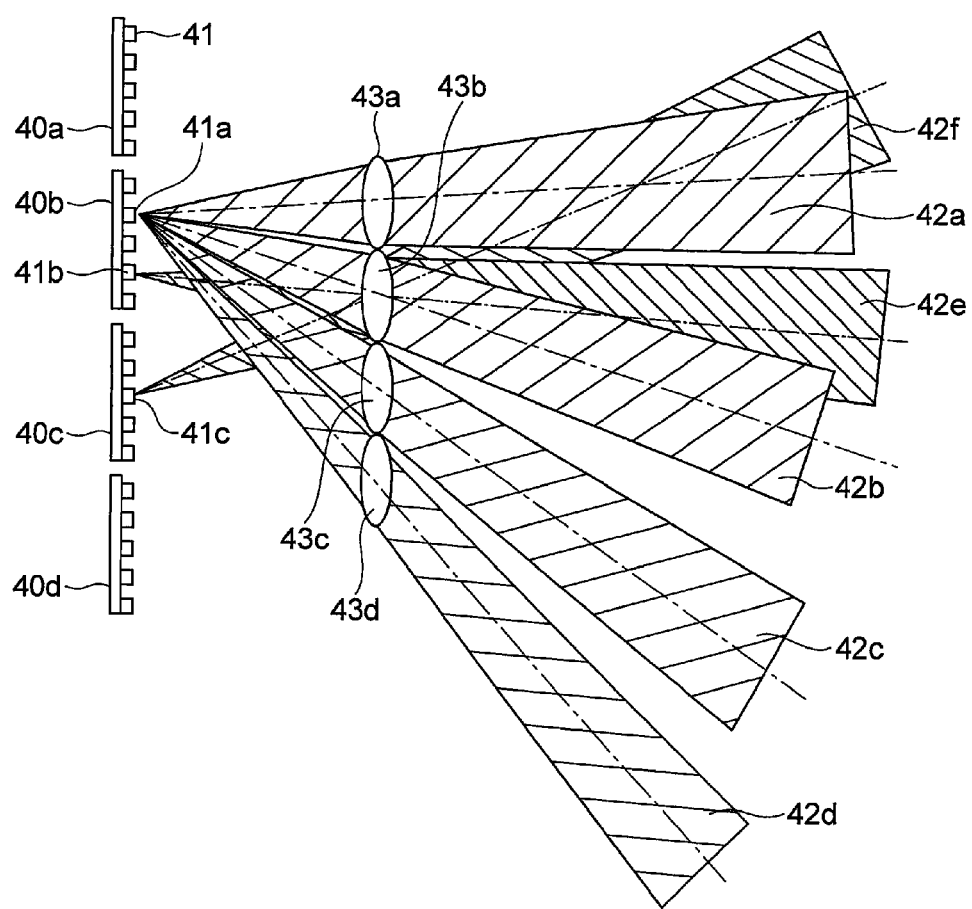
FIG. 15 is a diagram showing a structure in which pixels and lenses are not corresponding one-to-one.

FIG. 15 shows a structure in which pixels and lenses are not corresponding one-to-one. FIG. 15 shows, in a display apparatus having a plurality of pixels 40a, 40b, 40c and 40d (hereinafter, 'pixels 40a to 40d'), a plurality of light exit points 41 formed in each pixel, and lenses 43a, 43b, 43c and 43d (hereinafter, 'lenses 43a to 43d') of a micro lens array which makes light emerged from a light exit point 41a into a plurality of light beams 42a, 42b, 42c, 42d, 42e and 42f.

Although, only four pixels 40a to 40d are shown, practically, a large number of pixels are disposed two-dimensionally. Generally, a display device may be used such as a usual FPD like a liquid-crystal and an organic EL etc.

Although, only four lenses 43a to 43d forming the micro lens array are shown, actually, a large number of lenses are disposed two dimensionally. At this time, it is not necessary to match the size, the arrangement, and the number of pixels 40a and the lens 43a.

The required light beam as shown in FIG. 15 can be formed by only an arrangement shown here. Although, only five light exit points 41a formed in the pixels 40a to 40d are shown, it is needless to say that a large number of light exit points are formed in the pixels 40a to 40d.

Moreover, an arrangement of the pixels 40a to 40d is an arrangement of images which should be displayed. Regarding the light beams 42a to 42f, only representative ones are indicated. Actually, light from all the light exit points of all the pixels which are shown, forms respective light beams by all the lenses.

Here, it will be explained by using representative light beams. Light emerged from the light exit point 41a of the pixel 40b is generally diverged and spread. The light beams 42a, 42b, 42c and 42d are formed of the spreading light by the lenses 43a, 43b, 43c and 43d respectively. Light diverged from the other light exit point 41b of the same pixel 40b is similarly provide light beams by the lenses 43a, 43b, 43c, and 43d. Here, only the light beam 42e provided by the lens 43b is shown.

Also light diverged from the light exit point 41c of the other pixel 40c is similarly provide light beams by the lenses 43a, 43b, 43c, and 43d. Here, only the light beam 42f formed by the lens 43b is shown. In this manner, the lenses of the micro lens array make the light emerged from all the light exit points of all the pixels to light beams.

Forming of a light beam by one lens will be described below in further detail by using FIG. 16. The pixels 40a, 40b and 40c are projected by the lens 43, and become projected images 45a, 45b and 45c. Light exit points 41 formed to the pixels 40a, 40b and 40c respectively are projected by the lens 43 and become cross-sections 44 having a beam shape. It is evidently understood each pixel and each light exit point are projected by one lens. When a pupil 46 of the observer's eye is at a position shown in the diagram, the observer can observe the pixel 40a.

At this time, light beam incident on the pupil is smaller than the diameter of the pupil of the observer's eye. Therefore, the depth of field has increased as described in the abovementioned embodiments. As a result, even a person who cannot focus at the position of the display apparatus can see a focused display.

Figure 17:
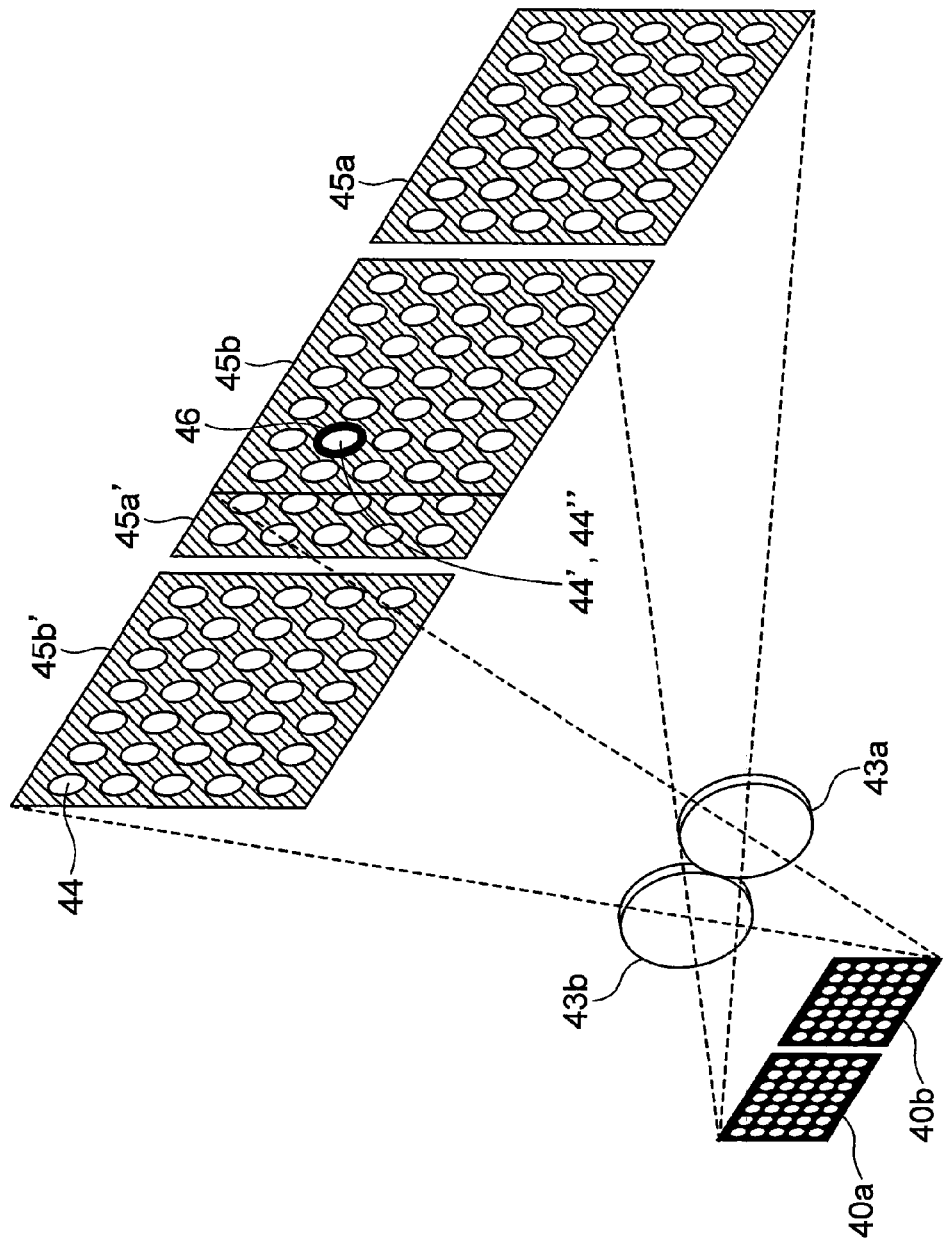
FIG. 17 is a diagram showing a micro lens array.

An effect of the micro lens array will be explained by referring to FIG. 17. For the sake of simplicity, only the two pixels 40a and 40b are shown. Also, only the two lenses 43a and 43a of the micro lens array are shown.

Figure 16:
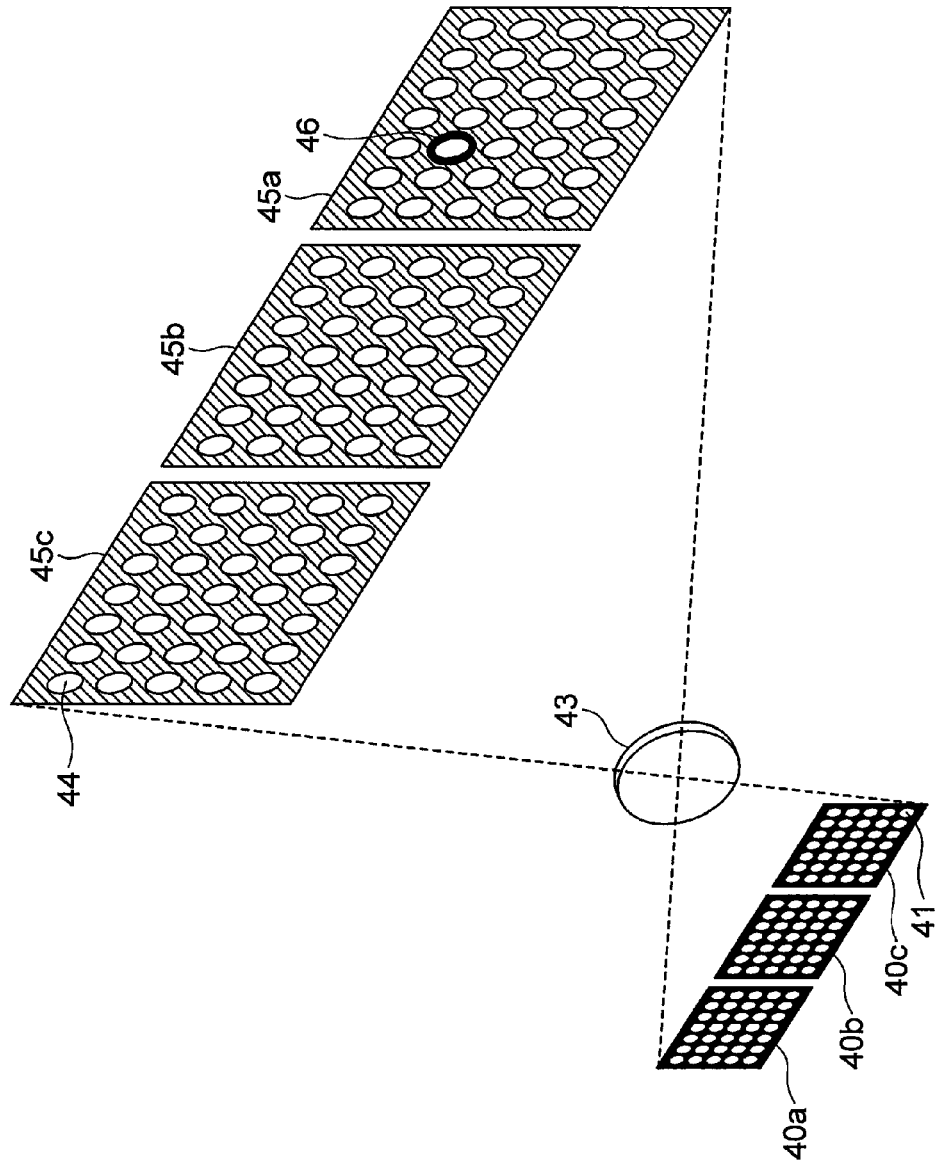
FIG. 16 is a diagram showing formation of a light beam by one lens.

As described in FIG. 16, the pixels 40a and 40b are projected by the lens 43a toward the observer, and projected images 45a and 45b of the pixels are formed. Similarly, the pixels 40a and 40b are projected by the lens 43b toward the observer, and projected images 45a' and 45b' of pixels are formed. Here, in the sixth embodiment, pixels and lenses of the micro lens array do not correspond one-to-one. In other words, a distance from a center of the pixel 40*a* up to a center of the pixel 40*b* differs from a distance from a center of the lens 43*a* up to the lens 43*b*. Therefore, apart of the projected image 45*a*' and apart of the projected image 45*b* are overlapped.

As it has been mentioned above, light exit points provided to each pixel become light beams and form a shape 44. When the pupil 46 of the observer is at a position indicated in the diagram, the pixels 40*a* and 40*b* can be observed. Namely, the pixel 40*b* can be observed by a light beam 44' of the pixel image 45*b* projected by the lens 43*a*. Moreover, the pixel 40*a* can be observed by a light beam 44" of the pixel image 45*a* projected by the lens 43*b*. Here, the light beam 44' and the light beam 44" are almost overlapped.

Since a light beam of a pixel is projected from each lens of the micro lens array to the pupil, it is possible to see the image. In the sixth embodiment, the pixels and the lenses of the micro lens array do not correspond one-to-one. It is not necessary to correspond one-to-one. When the pixels and the lenses of the micro lens array correspond one-to-one, shift amount of the pixel images 45*a* and 45*a*' correspond to the size of one pixel. When the pixels and the lenses of the micro lens array correspond one-to-one, the projected images 45*a*' and 45*b* overlap without being mismatched in a magnified projected image. Therefore, this situation is the same as pixels coincide each other.

Figure 18:
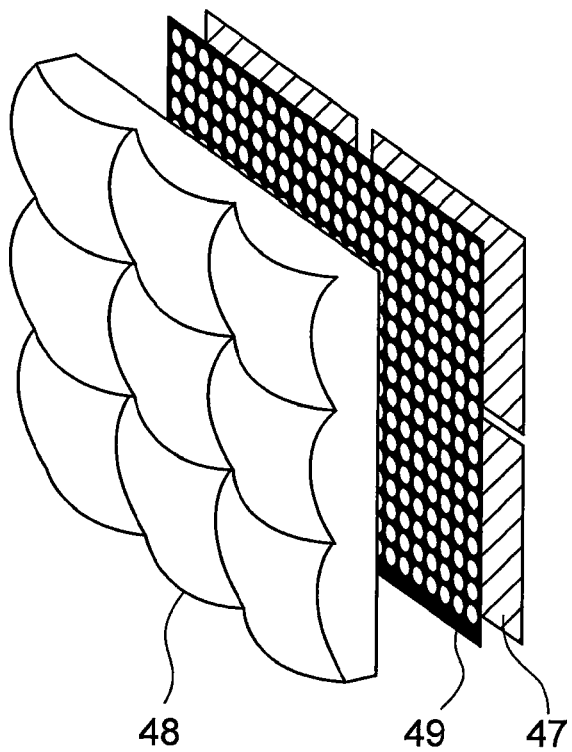
FIG. 18 is a diagram showing details of pixel structure.
Figure 19:
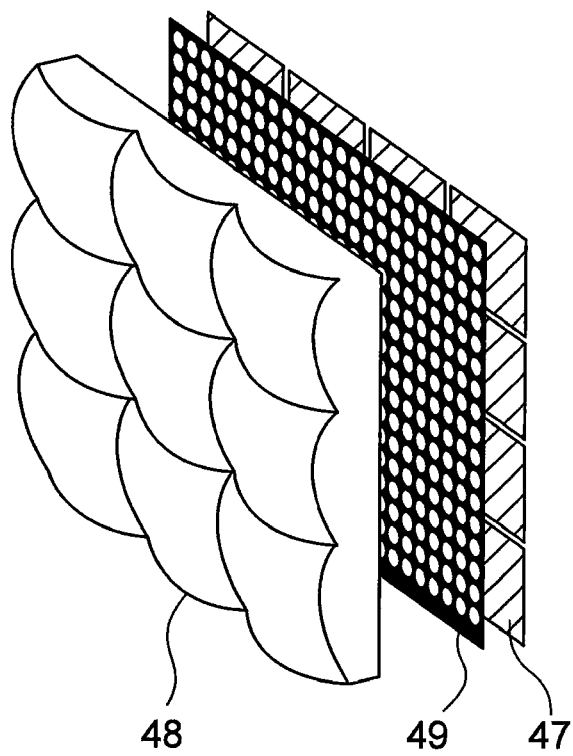
FIG. 19 is a diagram showing details of the pixel structure.

FIG. 18 and FIG. 19 show details of pixel arrangement. For the sake of simplicity, in FIG. 18, a micro lens array of 3×3 corresponds to a pixel 47 of 2×2. In FIG. 19, a micro lens array 48 of 3×3 corresponds to a pixel 47 of 4×4.

In the case of a self-emitting display such as a plasma panel, an arrangement is in order of a pixel 47, a mask 49 and a micro lens array 48. In the case of FIG. 18, one light beam each from each of the three lenses is incident on a pupil of an observer, respectively. Moreover, there are two pixels. Therefore, two light beams among of the three light beams have information of the same pixel. Therefore, resolution is the same as the number of pixels.

Whereas, in a structure shown in FIG. 19, one light beam each from each of the three lenses enters the pupil of the observer, respectively. Moreover, there are four pixels. Therefore, a light beam which has information of any one pixel does not enter the pupil of the observer. Therefore, the resolution is the same as the number of micro lenses.

In this manner, the resolution of this display apparatus is restricted to one of the number of pixels and the number of micro lenses, whichever is smaller. Therefore, it is preferable a lens of the micro lens array 48 correspond to each pixel (refer to FIG. 7 of the first embodiment).

Therefore, similarly as it is preferable that the size of the micro lens is less than or equal to 500 μm from the view point of resolution, it is preferable that the size of the pixel also is less than or equal to 500 μm.

Furthermore, it is assumed that a case in which two pixels are provided corresponding to one micro lens of a micro lens array. In this case, there is an apparatus which displays a stereo image by displaying a right-eye image and a left-eye image on the respective pixel. Namely, there is an apparatus which displays the right-eye image and the left-eye image alternately on each adjacent pixel. In the display apparatus according to the sixth embodiment, it is different regarding a point that each pixel has a plurality of light exit points, and a point that the arrangement of pixels is an arrangement of images which are displayed. Namely, the right-eye image and the left-eye image are not to be displayed alternately for each adjacent pixel.

Figure 20:
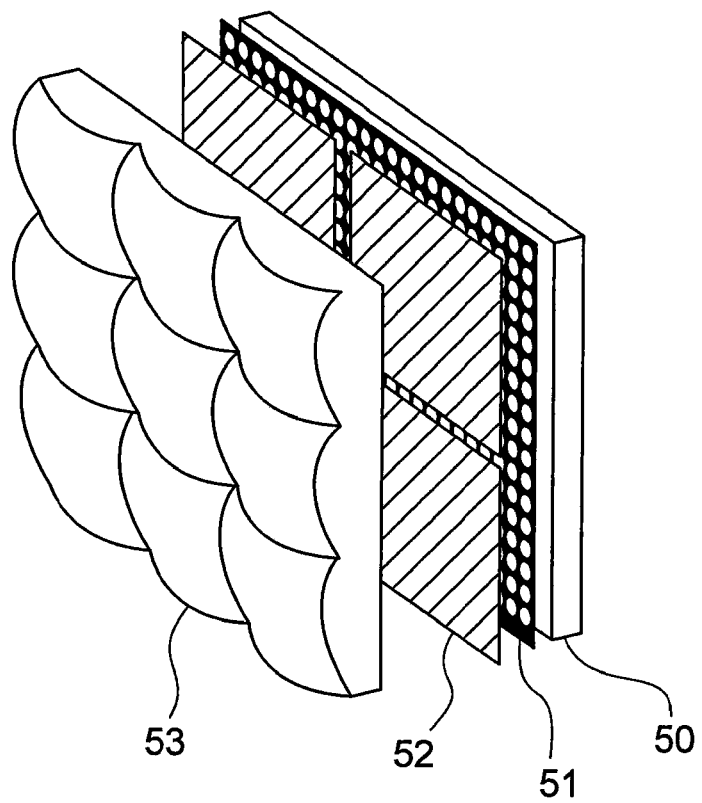
FIG. 20 is a diagram showing details of another pixel structure.
Figure 21:
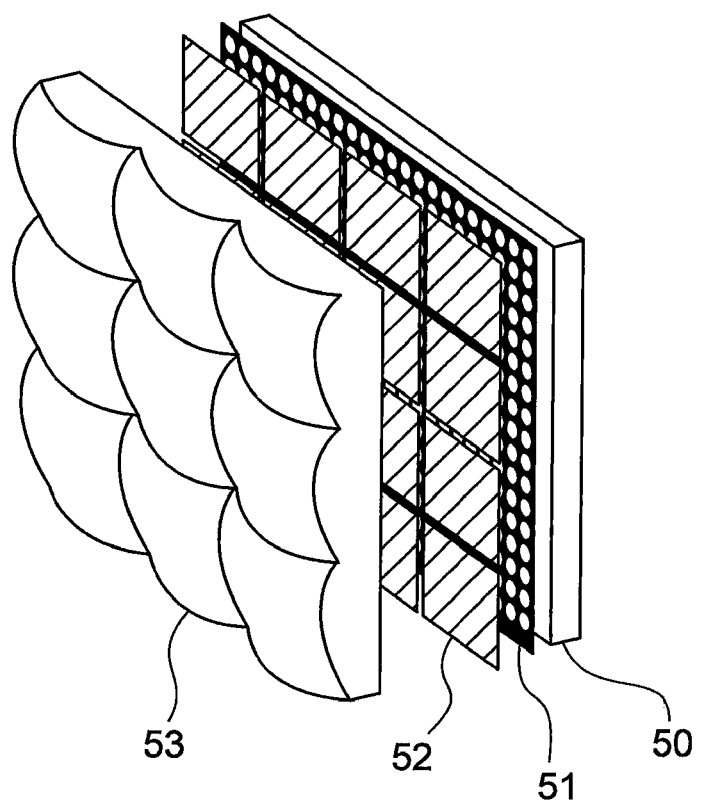
FIG. 21 is a diagram showing details of still another pixel structure.

FIG. 20 and FIG. 21 show examples of another pixel structures. For the sake of simplicity, in FIG. 20, a micro lens array 53 of 3×3 corresponds to a pixel 52 of 2×2. In FIG. 21, a micro lens array 53 of 3×3 corresponds to a pixel 52 of 4×4.

In the case of a display such as a liquid-crystal panel (generally called as 'LCD') which is non self-emitting and needs a light source at a rear surface, an arrangement may be made in order of a light source 50, a mask 51, a pixel 52, and a micro lens array 53. The light source 50 may be a light guide plate.

Similarly as it has been described above, it is preferable that a micro lens of the micro lens array 53 correspond to each pixel, and make it of the same size (FIG. 8 of the first embodiment).

It is preferable the pixel 52 is a pixel of a liquid-crystal panel. By making a surface of the mask 51 toward the light source (light guide plate) 50 a reflecting surface, it is possible to return light which has been shielded at the mask to the light guide plate. Accordingly, it is possible to use light efficiently.

It is preferable that a surface of the mask 51 toward the light guide plate is a reflecting surface. Although the light source 50, the mask 51, the pixel 52, and the micro lens array 53 are shown to have spaces and intervals in-between, the spaces and intervals are not necessarily required. The light source 50, the mask 51, the pixel 52, and the micro lens array 53 may be structured to be closely contacted integrally.

In diagrams from FIG. 18 to FIG. 21, arrangements of vertical and horizontal matrix of pixels and the corresponding micro lenses have been shown. However, the arrangement is not restricted to such an arrangement. It is desirable to match with the arrangement of pixels of a display device which is used. In the case of a color display, in which colors such as red (R), green (G), and blue (B) have been used, it is assumed to assign pixels with R, G and B or to switch three colors by dividing time (color sequential).

Seventh Embodiment

Figure 22:
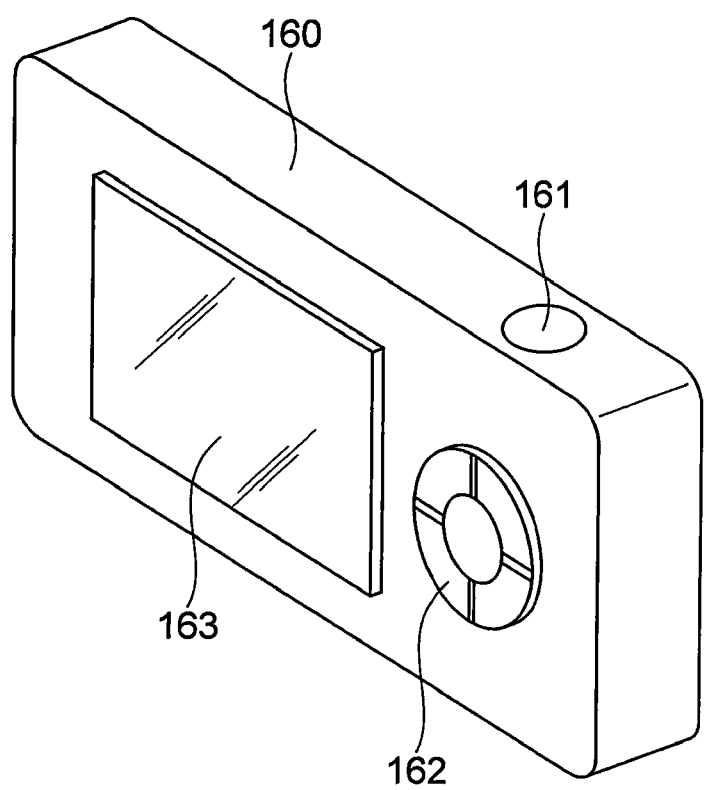
FIG. 22 is a diagram showing an appearance of a digital camera according to a seventh embodiment of the present invention.

Next, a digital camera which is an example of an image pickup apparatus according to a seventh embodiment will be described below. FIG. 22 shows an appearance of the digital camera. A digital camera 160 includes an image pickup lens which is attached front surface thereof but is not shown in the diagram. In addition, a release button 161, a mode button 162, and a display apparatus 163 are provided on a main body of the digital camera 160.

A user shoots by pressing the release button 161 while monitoring an image formed through an image pickup lens on the display apparatus 163. In a conventional image pickup apparatus, a person having farsightedness due to old age had a difficulty in focusing on a display unit with a naked eye. The person having farsightedness due to old age could not see accurately a focus and a picture composition or the information displayed on a GUI (graphical user interface). It is necessary to put on reading glasses for seeing the display. In the seventh embodiment, as the display unit 163, a display unit having a pixel arrangement including a mask having light exit points and the micro lens array shown in FIG. 8, is used. Therefore, even a person having farsightedness due to old age can monitor an image displayed without putting on reading glasses. Furthermore, the person having farsightedness due to old age can also monitor focus, picture composition, and information.

Namely, since it is possible to monitor a focused display of GUI, it is possible to shoot upon selecting an intended photography mode of one's choice by the mode button 162. The mode button denotes a type of switch which sets shooting conditions such as a shooting sensitivity, a scene mode, and a night-view mode. Further, it also includes a zoom lever (switch for operating zoom) which is not shown in the diagram. Although only one mode button is shown in FIG. 22, there are cases in which a plurality of mode buttons is provided.

Eighth Embodiment

Figure 23:
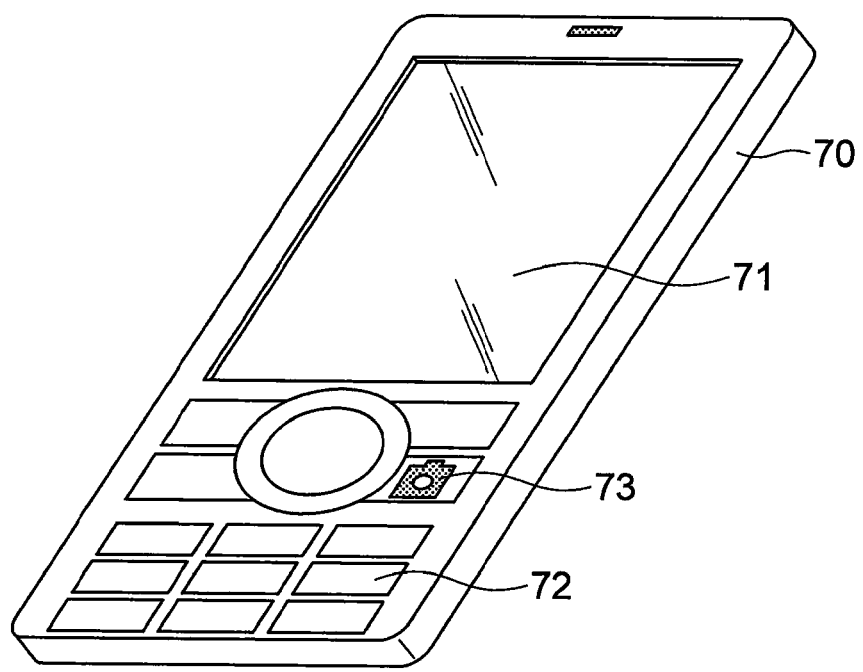
FIG. 23 is a diagram showing an appearance of a mobile telephone according to an eighth embodiment of the present invention.

Next, a mobile telephone which is an example of a mobile electronic equipment according to an eighth embodiment will be described below. FIG. 23 shows an appearance of the mobile telephone. A mobile telephone 70 includes a display unit 71, a numerical keypad 72 for inputting characters and a switch for conversation.

The mobile telephone is not only a telephone but also includes a display unit for acquiring information by mail and the Internet connection. In a conventional mobile telephone, a person having farsightedness due to old age has a difficulty in focusing to a display apparatus with a naked eye. It was hard to see characters of a mail and information on the Internet. It is necessary to put on reading glasses to see the display. The mobile telephone 70 according to the eighth embodiment uses the micro lens array described in FIG. 7 as the display unit 71 and an organic EL device of a pixel arrangement having a plurality of light emitting points for one pixel.

Therefore, even a person having farsightedness due to old age is capable of seeing information displayed on the display unit with a focused state without putting on the reading glasses. Moreover, it is possible that not only the telephonic conversation but also sending and receiving mails. Furthermore, by pressing a camera-mode switch 73, it is also possible to take photographs by a camera which is provided integrally to the mobile telephone which is not shown in the diagram. Even a person having farsightedness due to old age is able to take photographs by monitoring the picture composition and focus without putting on the reading glasses. The liquid-crystal device shown in FIG. 8 may be used as the display unit 71.

In the display method according to the present invention and the display apparatus and an optical unit using the display method, a beam incident on a pupil of an observer is smaller than a pupil diameter, and thereby a depth of field is increased. Therefore, a person who cannot focus at a display apparatus could see a focused display.

Therefore, when the display method, the display apparatus, and the optical unit according to the present invention are used, even a person having farsightedness due to old age is capable of seeing a focused display without putting on reading glasses. Furthermore, strain on eyes of a farsightedness observer is reduced and the observer is capable of observing without putting on reading glasses or adding any other optical member. Therefore, the person having farsightedness due to old age is capable of seeing in a focused state a monitor screen of a PC, a mobile telephone, a digital camera, and a car navigation system without putting on or taking off the reading glasses. Furthermore, even a nearsighted person, a person having farsightedness due to old age and an astigmatic person are capable of seeing a focused image (all information that is displayed, such as characters and not only pictures).

As it has been described above, the present invention is useful for a display apparatus such as a flat panel display and an electronic equipment in which such display apparatus is installed.

What is claimed is:

1. A method of displaying a picture image having a plurality of pixels, comprising:
   generating image information of the picture image by passing light through a displaying plane having the plurality of pixels;
   projecting light beams from the plurality of pixels of the picture image to form a projected image on a pupil of an eye of an observer, the projected image including a projection of each of the plurality of pixels of the picture image,
   wherein each diameter of the light beams which are incident on the pupil is smaller than a diameter of the pupil,
   light emerged from one pixel is projected as a plurality of light beams separated mutually, and
   at least one light beam of the plurality of light beams is incident on the pupil of the eye of the observer.

2. The method according to claim 1, wherein
   light emerged from one pixel is projected as a plurality of light beams separated mutually, and
   at least one light beam of the plurality of light beams is incident on the pupil of the eye of the observer.

3. The method according to claim 1, wherein the plurality of light beams which are separated mutually is formed by providing a plurality of light exit points in one pixel.

4. The method according to claim 1, wherein the light emerged from the pixel is formed as a light beam by a lens corresponding to the pixel.

5. The method according to claim 3, wherein the light exit points are disposed such that not less than one light beam and not more than four light beams among the plurality of light beams is/are incident on the pupil of the observer.

6. The method according to claim 1, wherein the diameter of the light beam which is incident on the pupil of the observer is in a range from 0.5 mm to 2 mm.

7. The method according to claim 4, wherein the light exit point is projected by the lens at a distance of more than 200 mm from a position of the lens by the lens.

8. The method according to claim 1, wherein an angle between the light beams which are mutually nearest among the plurality of the light beams separated mutually, is not more than 0.58 degrees.

9. The method according to claim 3, wherein the plurality of light exit points is formed by using a mask having a plurality of apertures.

10. A display apparatus which displays a picture image having a plurality of pixels, comprising:
    a plurality of light exit points formed corresponding to each pixel of the picture image; and
    a micro lens array, having lenses corresponding to each pixel, to project light beams from the plurality of pixels to form a projected image on a pupil of an eye of an observer.

11. A display apparatus which displays a picture image having a plurality of pixels, comprising:
    a plurality of light exit points formed in each pixel of the picture image; and
    a micro lens array, having lenses which form light emerged from light exit points as a plurality of light beams, to project the light beams from the plurality of pixels to form a projected image on a pupil of an eye of an observer.

12. The display apparatus according to claim 10, wherein rows of the plurality of pixels are rows of the plurality of pixels of the picture image which is to be displayed.

13. The display apparatus according to claim 10, wherein light emerged from the plurality of light exit points are formed as light beam by a lens corresponding to the pixel.

14. The display apparatus according to claim 10, wherein the projected image is formed by making the light beams incident on a pupil of an observer who uses the display apparatus.

15. The display apparatus according to claim 10, wherein a diameter of each of light beams from the plurality of light exit points is smaller than a diameter of the pupil of the observer.

16. The display apparatus according to claim 10, wherein the light exit points are disposed such that not less than one light beam and not more than four light beams among the plurality of light beams is/are incident on the pupil of the observer.

17. The display apparatus according to claim 10, wherein an interval of the light exit points is larger by more than twice a size of the light exit point.

18. The display apparatus according to claim 10, wherein a diameter of the light beam which is incident on the pupil of the observer who uses the display apparatus is in a range from 0.5 mm to 2 mm.

19. The display apparatus according to claim 10, wherein the light exit point is projected at a position of the pupil of the eye of the observer who uses the display apparatus by the micro lens array.

20. The display apparatus according to claim 10, wherein the light exit point is projected by the lens at a distance of more than 200 mm from a position of the lens by the lens.

21. The display apparatus according to claim 10, wherein a size of each lens in the micro lens array is in a range from 50 μm to 500 μm.

22. The display apparatus according to claim 10, wherein a size of the pixel is not more than 500 μm.

23. The display apparatus according to claim 10, wherein the plurality of the light exit points are formed by apertures.

24. The display apparatus according to claim 23, wherein the apertures are provided on a mask.

25. The display apparatus according to claim 24, wherein the mask is disposed at a position more toward the micro lens than a position of the pixel.

26. The display apparatus according to claim 10, wherein the pixel is formed by liquid crystals.

27. The display apparatus according to claim 26, wherein the mask is disposed at a position where is more toward a light guide plate than a position of the liquid crystals.

28. The display apparatus according to claim 27, wherein a surface of the mask toward the light guide plate is constituted by a reflecting surface.

29. The display apparatus according to claim 10, wherein the pixel is formed by an organic electro-luminescence device.

30. An optical unit for observation, comprising:
a micro lens array which includes a plurality of lenses; and
a mask having a plurality of apertures corresponding to each lens,
wherein the micro lens array projects light beams from the plurality of apertures to form a projected image on a pupil of an eye of an observer.

31. The optical unit according to claim 30, wherein the mask is formed integrally with the micro lens array.

32. The optical unit according to claim 30, wherein an image of the mask is projected by the lens at a distance of more than 200 mm from the lens by the lens.

33. The optical unit according to claim 30, where, a size of the lens is in a range from 50 μm to 500 μm.

34. The optical unit according to claim 30, wherein the micro lens array is made of a flexible material.

35. A method of manufacturing a display apparatus which displays a picture image having a plurality of pixels, comprising:
providing a plurality of light exit points in a region corresponding to each of the pixels of the picture image; and
forming a micro lens array near the plurality of light exit points,
wherein the micro lens array projects light beams from the plurality of pixels to form a projected image on a pupil of an eye of an observer.

36. The method of manufacturing according to claim 35, wherein the plurality of light exit points is formed by printing on the pixel.

37. The method of manufacturing according to claim 35, further comprising:
disposing a lens in the micro lens array corresponding to each pixel.

38. The method of manufacturing according to claim 35, wherein the micro lens array is formed by nanoimprint technology.

39. The method of manufacturing according to claim 35, further comprising:
joining the micro lens array to the pixel.

40. The method of manufacturing according to claim 35, wherein a diameter of a light beam from the plurality of light exit points is smaller than a diameter of a pupil of an eye of an observer.

41. The method of manufacturing according to claim 35, wherein the light exit points are disposed such that not less than one light beam and not more than four light beams among the plurality of light beams is/are incident on the pupil of the observer.

42. The method of manufacturing according to claim 40, wherein the diameter of the light beam incident on the pupil of the observer who uses the display apparatus is in a range from 0.5 mm to 2 mm.

43. The method of manufacturing according to claim 40, wherein the light exist point is projected at a distance of more than 200 mm from a position of the lens by the lens.

44. The method of manufacturing according to claim 35, wherein a size of the lens is in a range from 50 μm to 500 μm.

45. An electronic equipment comprising:
a display apparatus according to claim 10.

46. A mobile electronic equipment comprising:
a display apparatus according to claim 10.

47. A mobile telephone comprising:
a display apparatus according to claim 10.

48. The mobile telephone according to claim 47, further comprising:
a mail function.

49. The mobile telephone according to claim 47, further comprising:
a camera function.

50. An image pickup apparatus comprising:
a display apparatus according to claim 10.

51. The image pickup apparatus according to claim 50, further comprising:
a switch for setting photography conditions.

* * * * *